(12) United States Patent
Neustel

(10) Patent No.: US 9,256,594 B2
(45) Date of Patent: Feb. 9, 2016

(54) PATENT ANALYZING SYSTEM

(71) Applicant: Michael S. Neustel, Fargo, ND (US)

(72) Inventor: Michael S. Neustel, Fargo, ND (US)

( * ) Notice: Subject to any disclaimer, the term of this patent is extended or adjusted under 35 U.S.C. 154(b) by 0 days.

(21) Appl. No.: 14/215,950

(22) Filed: Mar. 17, 2014

(65) Prior Publication Data

US 2014/0200880 A1 Jul. 17, 2014

Related U.S. Application Data

(63) Continuation-in-part of application No. 13/445,109, filed on Apr. 12, 2012, now Pat. No. 8,861,796, which is a continuation of application No. 12/132,674, filed on Jun. 4, 2008, now Pat. No. 8,160,306.

(60) Provisional application No. 60/942,361, filed on Jun. 6, 2007, provisional application No. 61/802,109, filed on Mar. 15, 2013.

(51) Int. Cl.
*G06K 9/00* (2006.01)
*G06F 17/27* (2006.01)

(52) U.S. Cl.
CPC .................................. *G06F 17/2765* (2013.01)

(58) Field of Classification Search
None
See application file for complete search history.

(56) References Cited

U.S. PATENT DOCUMENTS

| | | | |
|---|---|---|---|
| 5,144,679 A | 9/1992 | Kakumoto | |
| 5,754,840 A | 5/1998 | Rivette | |
| 6,002,798 A | 12/1999 | Palmer | |
| 6,014,663 A | 1/2000 | Rivette | |
| 6,038,561 A | 3/2000 | Snyder | |
| 6,793,429 B2 | 9/2004 | Arrison | |
| 7,523,126 B2 | 4/2009 | Rivette | |
| 7,853,572 B2 | 12/2010 | Lundberg | |
| 7,890,851 B1 | 2/2011 | Milton, Jr. | |
| 7,941,468 B2 | 5/2011 | Zellner | |
| 8,036,493 B1 * | 10/2011 | Neustel | 382/297 |
| 8,160,306 B1 * | 4/2012 | Neustel | 382/113 |
| 8,213,748 B2 | 7/2012 | Kimura | |
| 8,412,659 B2 | 4/2013 | Avasarala | |
| 8,520,982 B2 | 8/2013 | Chan | |
| 2001/0049707 A1 * | 12/2001 | Tran | G06Q 10/10 715/256 |
| 2003/0196173 A1 * | 10/2003 | Petruzzi | G06Q 10/10 715/234 |
| 2005/0210009 A1 * | 9/2005 | Tran | 707/3 |
| 2006/0155690 A1 | 7/2006 | Wen | |
| 2008/0115057 A1 | 5/2008 | Grandhi | |
| 2010/0125566 A1 * | 5/2010 | Gibbs et al. | 707/722 |

OTHER PUBLICATIONS

Patent Full-Text and Full-Page Image Database from United States Patent and Trademark Office.
http://www.patentcafe.com; PatentCafe, Advanced Technology Patent Search; Patent Analytics and Intellectual Property Management Solutions.
http://www.patenthunter.com; PatentHunter software by Neustel Software, Inc.

* cited by examiner

*Primary Examiner* — Nancy Bitar
(74) *Attorney, Agent, or Firm* — Neustel Law Offices

(57) ABSTRACT

A patent analyzing system for efficiently reviewing and analyzing a patent document (e.g. patent application, published patent document or patent). The patent analyzing system includes providing a patent document, wherein said patent document includes text data having a claims section, identifying a first element name within a first claim in said claims section, and emphasizing said first element name within said first claim.

12 Claims, 35 Drawing Sheets

| PatentAnalyzer Trial Version (Project 5444333) | | _ □ X |
|---|---|---|
| File Settings Tools Help | | |

5444333  (ANALYZE)  (STOP)   Prior Projects: [Select Existing Project ▽]

| Index of Elements | Specification | Claims | Images |

(PRINT)  (OPEN IN WORD)

Index of Elements for U.S. Patent No. 5444333

| # | Element | # | Element |
|---|---|---|---|
| 1: | First | 48: | Inductor Circuit |
| 1/2: | Terminals | 48: | Inductor Arrangement |
| 10: | AC Power Source | 48: | Inductor |
| 10: | Power Supply | 49: | Secondary Winding |
| 12: | DC Converter | 52: | Transistor |
| 12: | AC-DC Unit | 52: | Switch Transistor |
| 12: | AC-DC Converter Circuit | 56: | Resistors |
| 14: | Half Bridge Inverter | 62: | Capacitor |
| 14: | DC-AC Circuit | 62: | Output Capacitor |
| 14: | AC Converter Circuit | 62: | Simply Place Capacitor |
| 16: | Inductor | 62: | Storage Capacitor |
| 18: | Filaments | 64: | Controller |
| 18: | Second Filament | 68: | Resistor |
| 18: | Element | 72: | Capacitor |
| 20: | Tube | 78: | Capacitor |
| 20: | Fluorescent Tube | 82: | Diode |
| 20: | Fluorescent Light Tube | 86: | Capacitor |
| 22: | Capacitance | 88: | Capacitor |
| 22: | Capacitors | 90: | Resistor |
| 22/24: | Capacitors | 92: | Diac |
| 24: | Capacitor | 94: | Diode |
| 24: | Capacitance | 96: | Power Transistors |
| 26: | Starter | 98: | Power Transistor |
| 26: | Starter Circuit | 98: | Transistor |
| 28: | Protection Fuse | 100: | Zener Diodes |
| 30: | Capacitors | 104: | Secondaries |
| 32: | Inductors | 112: | Primary |
| 36: | Diode Bridge | 114: | Capacitor |
| 42: | Resistor | 116: | Thermistor |
| 44: | Capacitor | 116: | PTC Thermistor |
| 44: | Supply Capacitor | 118: | Resistors |
| 44: | Charge Capacitor | 122: | Capacitor |
| 46: | Diode | 124: | Diac |
| 126: | Triac | | |

Developed in Cooperation with Neustel Law Offices, LTD
Analysis of Patent Number: 5444333 Complete

Index of Elements for U.S. Patent No. 6793429

| | |
|---|---|
| 10: | Outer Tube |
| 10: | Tubular Elongate Outer Body |
| 11: | Chalk |
| 12: | Chalk Holder |
| 14: | Ratchet Teeth |
| 16: | Ramps |
| 16: | Accepting Ramps |
| 18: | First Retaining Ridge |
| 18: | First Spring-Retaining Ridge |
| 20: | Second Retaining Ridge |
| 20: | Second Spring-Retaining Ridge |
| 22: | Resilient Element |
| 24: | Slots |
| 26: | Spring Fingers |
| 26: | Jaws |
| 26: | Fingers |
| 26: | Jaw Members |
| 28: | End |
| 28: | Platform |
| 30: | Notch |
| 32: | Child-Resistant Screw Cap |
| 34: | Pawls |
| 36: | Disc |
| 36: | Flexible Disk |
| 50: | Projection |
| 50: | Internal Projection |

FIG. 19

FIG. 3 is a schematic perspective view of the inner, chalk holder portion of the device of the invention.
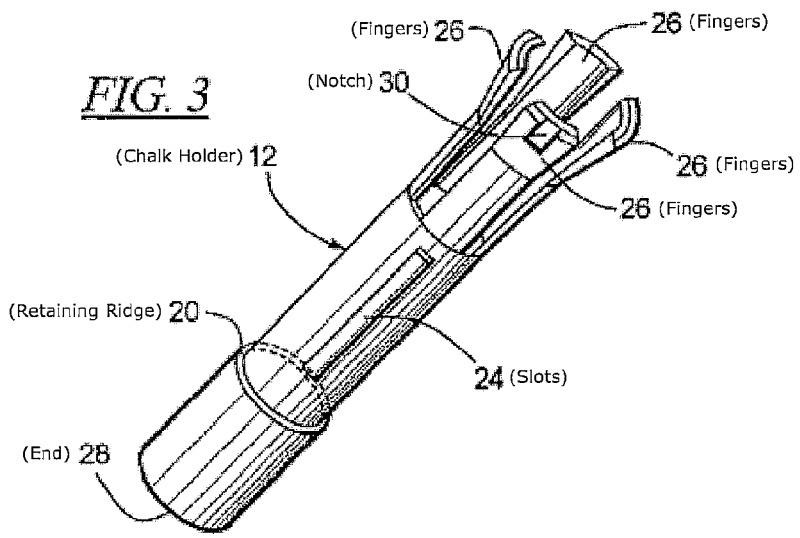
FIG. 4 is a cross-section of a child-resistant screw cap for use as a part of the device of the present invention.
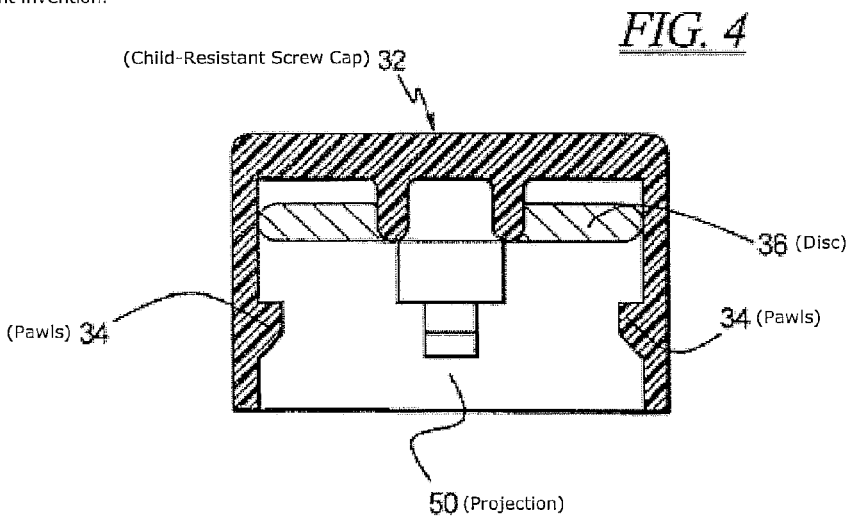
FIG. 20

FIG. 3 is a schematic perspective view of the inner, chalk holder portion of the device of the invention.

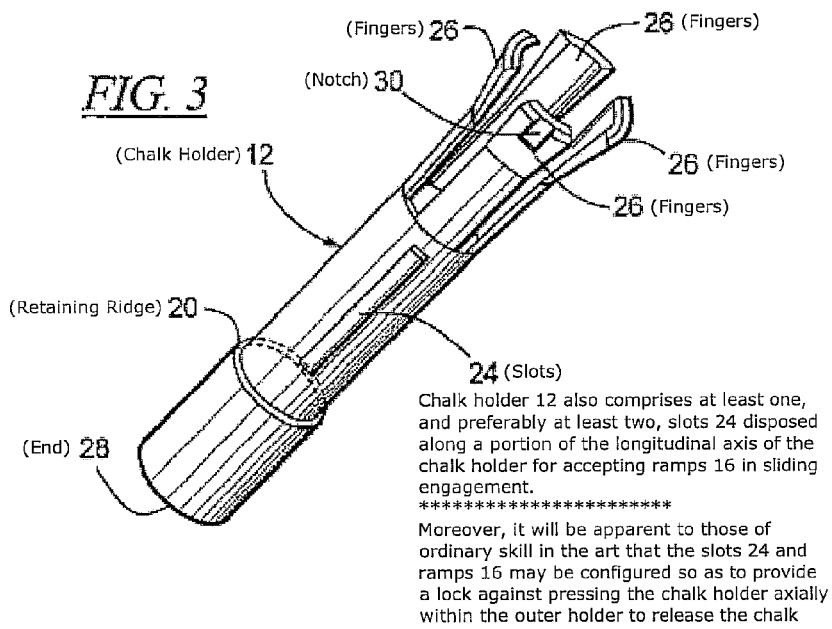

Chalk holder 12 also comprises at least one, and preferably at least two, slots 24 disposed along a portion of the longitudinal axis of the chalk holder for accepting ramps 16 in sliding engagement.
\*\*\*\*\*\*\*\*\*\*\*\*\*\*\*\*\*\*\*\*
Moreover, it will be apparent to those of ordinary skill in the art that the slots 24 and ramps 16 may be configured so as to provide a lock against pressing the chalk holder axially within the outer holder to release the chalk FIG. 4 is a cross-section of a child-resistant screw cap for use as a part of the device of the present invention.

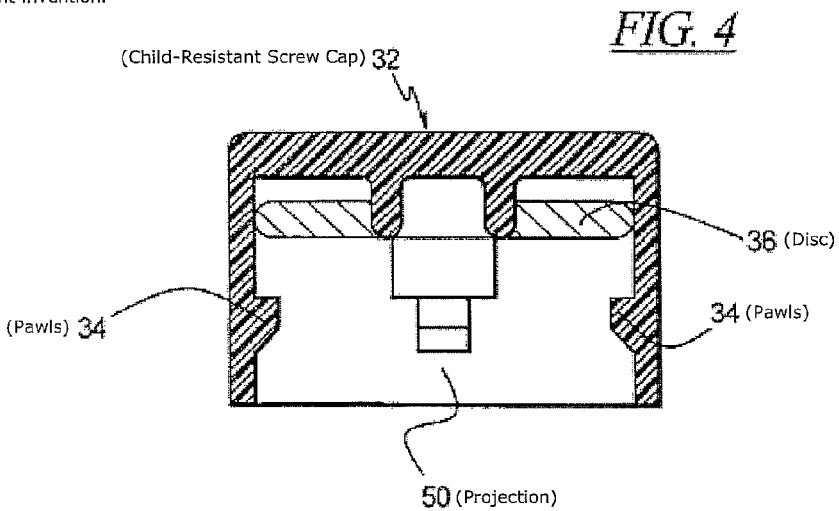

FIG. 21

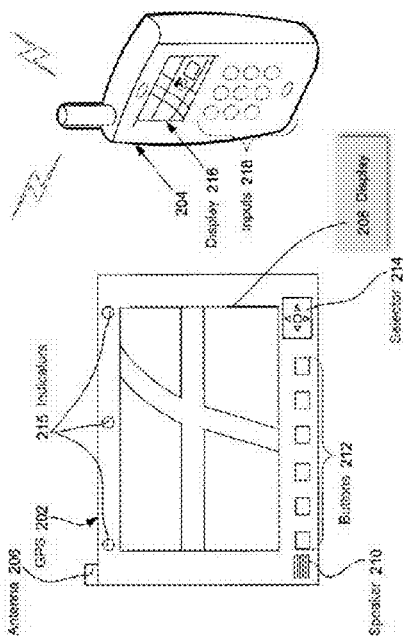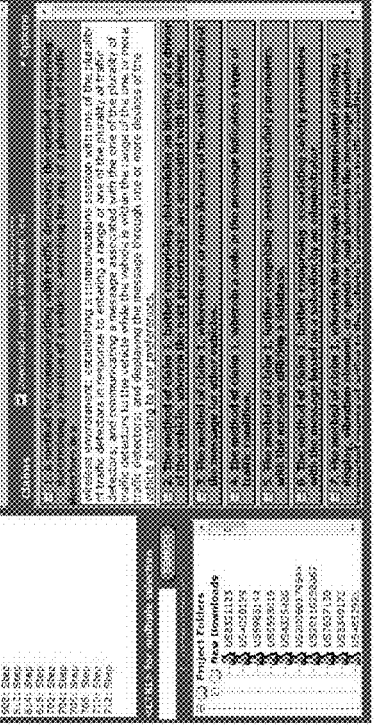
FIG. 25

Claims 1-5 of U.S. Patent No. 6,416,269 Analyzed

1. A fastener usable with an elongated connector for securing a first board to an underlying supporting member and to at least one other board running adjacent and parallel to the first board, said fastener being made entirely of a single piece of cut and bent sheet metal and comprising:

a thin flat body portion (12) having front and rear faces (14, 16) and top and bottom edges (18, 20), said top and bottom edges defining vertical limits of the body portion (12) and the body portion (12) extending vertically between said top and bottom edges;

a first prong (30) extending outwardly from said front face (14) of said body portion (12) for driving into a first board (24);

second prong (40) extending outwardly from the rear face (16) of said body portion (12) for penetrating a second board (26), said second prong (40) running adjacent and parallel to and in a direction opposite from that of said first prong (30);

said body portion (12) having an opening (50) capable of receiving an elongated connector (52) inserted through said opening (50) with said connector (52) being inclined to and passing through said body portion (12) for fastening said body portion (12) to a supporting member (44) supporting and underlying the first and second boards (24, 26); and a third prong (42) coplanar with the body portion (12) and extending downwardly from said bottom edge (20) of said body portion (12) and having a pointed end spaced downwardly from said body portion (12) bottom edge so that immediately prior to the driving of said first prong (30) into the first board (24) said pointed end of said third prong (42) can be rested on said underlying supporting member (44) to position said fastener vertically relative to said first board (24) during the driving of said first prong (30) into the first board (24), and then when said connector (52) is applied to fasten the body member to the underlying supporting member (44) said third prong (42) can penetrate into said underlying supporting member (44) to allow said first board (24) to move downwardly closer to sad underlying supporting member (44), in the event said first board (24) was spaced slightly upwardly from the underlying support member (44) at the time of driving said first prong (30) into said first board (24), without the bottom edge of the body portion (12) hindering such downward movement of the first board (24) closer to the underlying supporting member (44).

2. The fastener of claim 1, wherein said third prong (42) extends parallel to said body portion (12).

3. The fastener of claim 1, wherein said third prong (42) is wedge shaped.

4. The fastener of claim 1, wherein said third prong (42) is one of two such third prongs extending downwardly from the bottom edge of the body portion (12) and which two third prongs are spaced from one another along said bottom edge.

5. The fastener of claim 1, wherein said first prong is wedge shaped.

FIG. 26

Example Format for Adding Citations to Patent Text

[CITATION TO ORIGINAL PATENT DOCUMENT]:
[CORRESPONDING TEXT FROM PATENT DOCUMENT]

FIG. 27a

Example of Adding Citation to Patent Text in '123 Patent

<u>PAGE 11, COLUMN 3, LINES 3-13:</u> FIG. 2 is a pictorial representation of a GPS and a GPS-enabled wireless device in accordance with an illustrative embodiment. FIG. 2 includes a GPS 202 and a wireless device 204. The GPS may be a vehicle integrated unit or an external GPS. Correspondingly, the GPS 202 may be built into the vehicle 100 of FIG. 1 or may be used or externally mounted in the vehicle. The GPS 202 may include an antenna 206, a display 208, a speaker 210, buttons 212, a selector 214, and an indicator 215. The wireless device 204 may include any elements of the GPS 202. The wireless device 204 includes a display 216 and inputs 218.

FIG. 27b fragrance dispensing construction. The base (300) has a first light source set (303) and a second light source (304) with a heat element (309) and switch (310) installed on the circuit (314). The circuit (314) is located within the front base (316)

FIG. 28

PATENT ANALYZING SYSTEM

CROSS REFERENCE TO RELATED APPLICATIONS

I hereby claim benefit under Title 35, United States Code, Section 120 of U.S. patent application Ser. No. 13/445,109 filed Apr. 12, 2012. This application is a continuation-in-part of the Ser. No. 13/445,109 application. The Ser. No. 13/445,109 application is currently pending. The Ser. No. 13/445,109 application is hereby incorporated by reference into this application. The Ser. No. 13/445,109 application claims priority to the Ser. No. 12/132,674 application and the 60/942,361 application.

I hereby claim benefit under Title 35, United States Code, Section 120 of U.S. patent application Ser. No. 12/132,674 filed Jun. 4, 2008. The Ser. No. 12/132,674 application issued as U.S. Pat. No. 8,160,306 on Apr. 17, 2012. The Ser. No. 12/132,674 application is hereby incorporated by reference into this application. The Ser. No. 12/132,674 application claims priority to the 60/942,361 application.

I hereby claim benefit under Title 35, United States Code, Section 119(e) of U.S. provisional patent application Ser. No. 61/802,109 filed Mar. 15, 2013. The 61/802,109 application is hereby incorporated by reference into this application.

I hereby claim benefit under Title 35, United States Code, Section 119(e) of U.S. provisional patent application Ser. No. 60/942,361 filed Jun. 6, 2007. The 60/942,361 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to patent management tools and more specifically it relates to a patent analyzing system for efficiently reviewing and analyzing a patent document (e.g. patent application, published patent document or patent).

2. Description of the Related Art

Any discussion of the prior art throughout the specification should in no way be considered as an admission that such prior art is widely known or forms part of common general knowledge in the field.

Conventional patent analysis software is currently used to analyze the content of large numbers of patents (referred to often times as "patent analytics"). In additional to patent analysis software available, software and websites are available that allow for the searching, downloading and viewing of patents (e.g. PATENTHUNTER, www.uspto.gov, www.ipsearchengine.com). While the previous patent analysis and patent searching software are good for the purpose they are intended, they are not focused upon the detailed analysis of the content for an individual patent.

BRIEF SUMMARY OF THE INVENTION

The present invention generally comprises identifying the element names within a patent document and modifying patent drawing sheets to include element names and figure descriptions.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a patent analyzing system that will overcome the shortcomings of the prior art systems.

A second object is to provide a patent analyzing system for efficiently reviewing and analyzing a patent document (e.g. patent application, published patent document or patent).

Another object is to provide a patent analyzing system that reduces the amount of time required to review and analyze a patent document.

An additional object is to provide a patent analyzing system that reduces the amount of time required to review and analyze the written portion of a patent document.

A further object is to provide a patent analyzing system that reduces the amount of time required to review and analyze the claims portion of a patent document.

Another object is to provide a patent analyzing system that reduces the amount of time required to review and analyze the drawings of a patent document.

A further object is to provide a patent analyzing system that may be utilized to analyze various types of patent documents including but not limited to non-filed patent applications, filed patent applications, published patent applications, and granted patents.

A further object is to provide a patent analyzing system that is able to analyze various formats of patent data including but not limited to HTML, XML, text, TIFF and PDF.

Another object is to provide a patent analyzing system that analyzes the text and image portion of a patent document.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4 is an exemplary interface of the present invention illustrating an index of elements created for U.S. Pat. No. 5,444,333.

Figure 5:
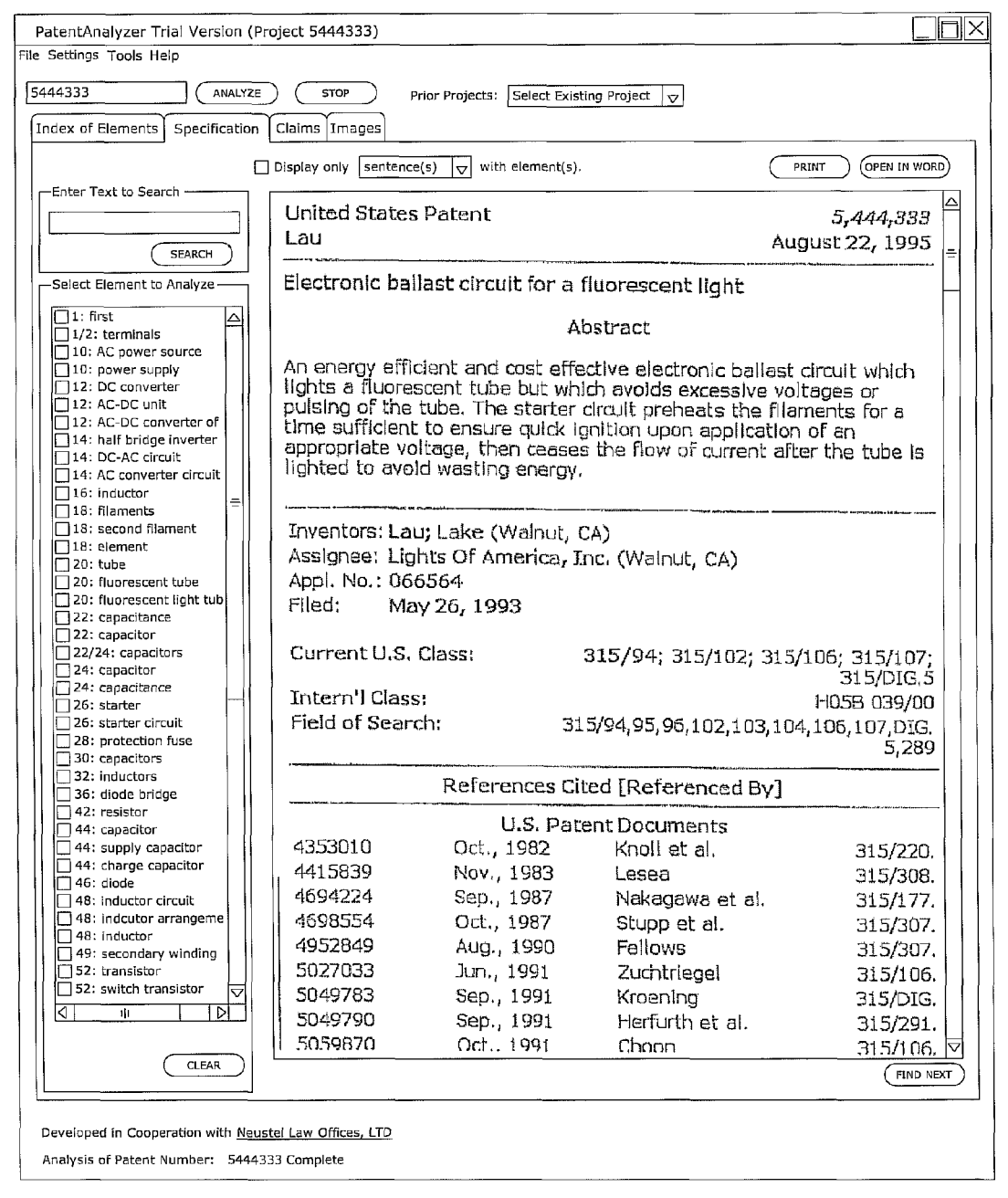

FIG. 5 is an exemplary interface of the present invention illustrating the display of the text portion of U.S. Pat. No. 5,444,333.

FIG. 12 is an exemplary interface of the present invention illustrating the images of U.S. Pat. No. 5,444,333.

FIG. 19 is an exemplary table illustrating the index of elements generated for U.S. Pat. No. 6,793,429.

FIG. 20 is an illustration of the element names and figure descriptions inserted into the image of the patent drawings of U.S. Pat. No. 6,793,429.

FIG. 21 is an illustration of the element names and figure descriptions inserted into the image of the patent drawings of U.S. Pat. No. 6,793,429 along with a pop-up text for element number 24 being selected showing the corresponding sentence text that contain the element number 24.

FIG. 25 illustrates FIG. 2 of U.S. Pat. No. 8,321,123 ("the '123 patent") with the corresponding figure text displayed on the image page of FIG. 2 of the '123 patent so the user can easily read all references to FIG. 2 in the patent specification of the '123 patent.

FIG. 26 illustrates an example claim (claim 1 of U.S. Pat. No. 6,416,269) illustrating the emphasis of element names and adding of element numbers in the claim.

FIG. 27a provides an example format for displaying the citation to the original patent document for text in the patent document.

FIG. 27b illustrates an example of displaying the citation to the original patent document for text in the '123 patent.

FIG. 28 illustrates an example of displaying a portion of an image from a patent document containing an element name and/or element number selected by the user with emphasis added to the corresponding element name/number.

DETAILED DESCRIPTION OF THE INVENTION

A. Introduction

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The present invention may be operated as a computer program installed upon a download computer 20, via a website or other system. It can be also appreciated that even though the description below is about downloading, searching and managing electronic patent files, the present invention may also be utilized for downloading, searching and managing electronic trademark files and other types of electronic data (e.g. HTML).

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

B. Exemplary Global Computer Network

Figure 1:
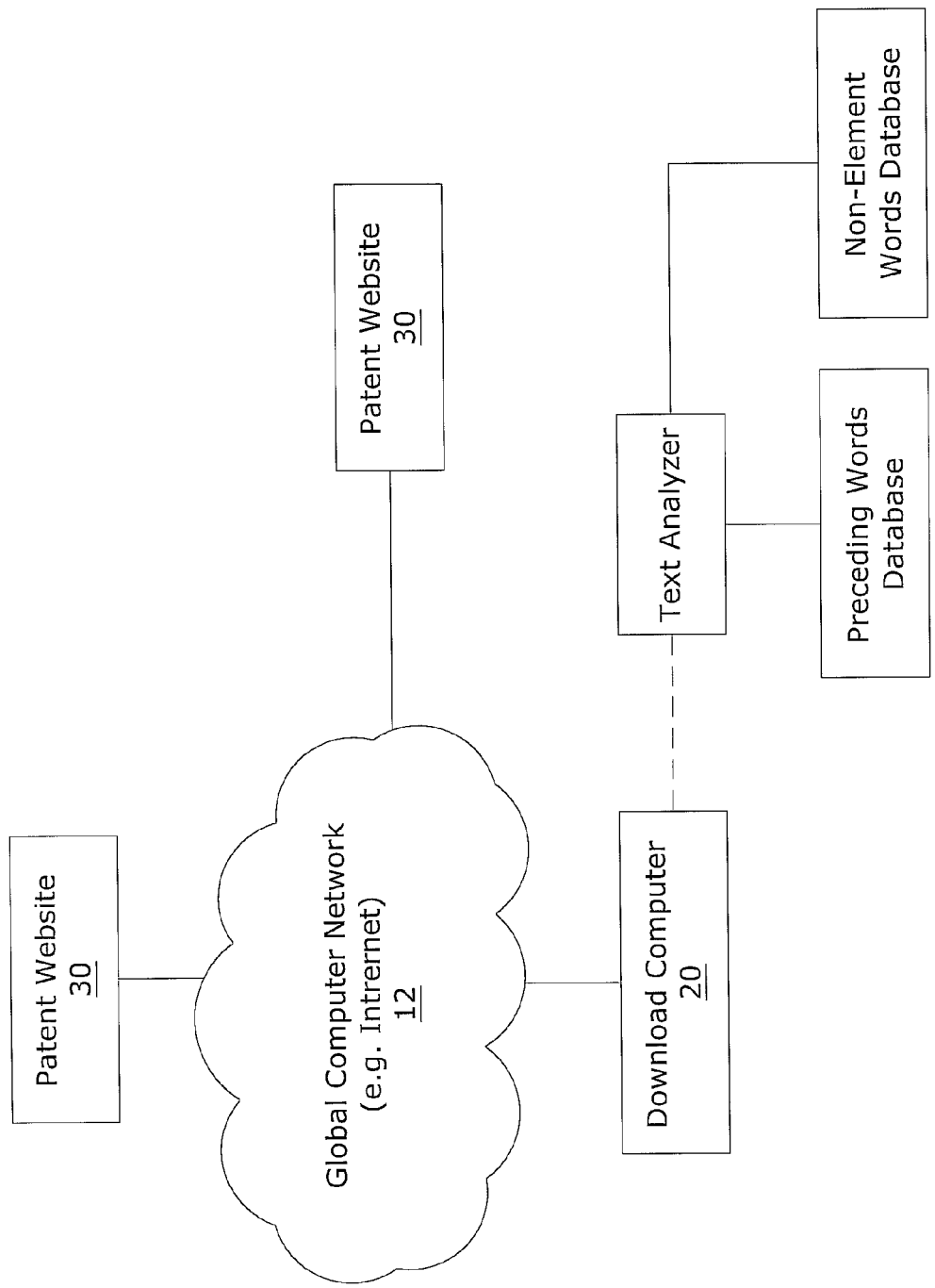
FIG. 1 is a block diagram of an exemplary computer network with a download computer and patent websites connected to the exemplary computer network.

As shown in FIG. 1, the global computer network (e.g. Internet) 12 is an exemplary communications network for the present invention. The Internet 12 is basically comprised of a "global computer network." A plurality of computer systems around the world are in communication with one another via this global computer network and are able to transmit various types of data between one another. The communications between the computer systems may be accomplished via various methods such as but not limited to wireless, Ethernet, cable, direct connection, telephone lines, and satellite. One or more web servers typically provide the data to the computer systems connected via the Internet 12.

The present invention may also be utilized upon global computer networks, local area networks (LAN), wide area networks (WAN), campus area networks (CAN), metropolitan-area networks (MAN), and home area networks (HAN). Various protocols may be utilized by the electronic devices for communications such as but not limited to HTTP, SMTP, FTP and WAP (Wireless Application Protocol). The present invention may be implemented upon various wireless networks such as but not limited to CDPD, CDMA, GSM, PDC, PHS, TDMA, FLEX, REFLEX, IDEN, TETRA, DECT, DATATAC, and MOBITEX. The present invention may also be utilized with online services and internet service providers such as AMERICA ONLINE (AOL), COMPUSERVE, WEBTV, and MSN INTERNET SERVICES. The present invention preferably utilizes the Internet 12 for transmitting data, however it can be appreciated that as future technologies are created that various aspects of the invention may be practiced with these improved technologies.

The present invention is preferably embodied within a software application installed upon the download computer 20. However, the present invention may be embodied in various other manners such as but not limited to a central server computer or a web server that merely provide the results of the analyzed patent data.

C. Patent Documents

Patent documents may be comprised of various documents including but not limited to non-filed patent applications, filed patent applications, published patent applications, granted patents, patent certificates and patent file wrappers. Downloading patent files (image and/or text) from patent websites 30 (e.g. www.uspto.gov, ep.espacenet.com/) via a global computer network 12 is well known in the art. The patent files may be comprised of issued patents, published applications or related patent data. Various software programs (e.g. PATENTHUNTER sold by Neustel Software, Inc.) and websites currently allow for the downloading of patent files from patent websites 30.

A "patent number" may be comprised of a United States or foreign patent number (typically with a patent code in front of it). For example, PCT published applications have the prefix "WO" and Japanese patents have the prefix "JP" before the patent number which are universally utilized to identify the patent document. A patent number may also be comprised of issued patents, published applications or other patent related data. With the present invention, if a letter prefix is not provided in the patent number, then the present invention assumes the patent number is a United States patent document thereby not requiring the user to enter "US" as a prefix.

The patent documents are in a computer readable file format and may be available direction from the computer 20 or via downloading through the global computer network 12. For example, a user may analyze the text of a MICROSOFT WORD document containing a patent application or an HTML file downloaded from the global computer network. Various other file formats may be analyzed with the present invention.

D. Text Analysis of Patent Documents

1. Downloading/Importing Patent Documents

Figure 2:
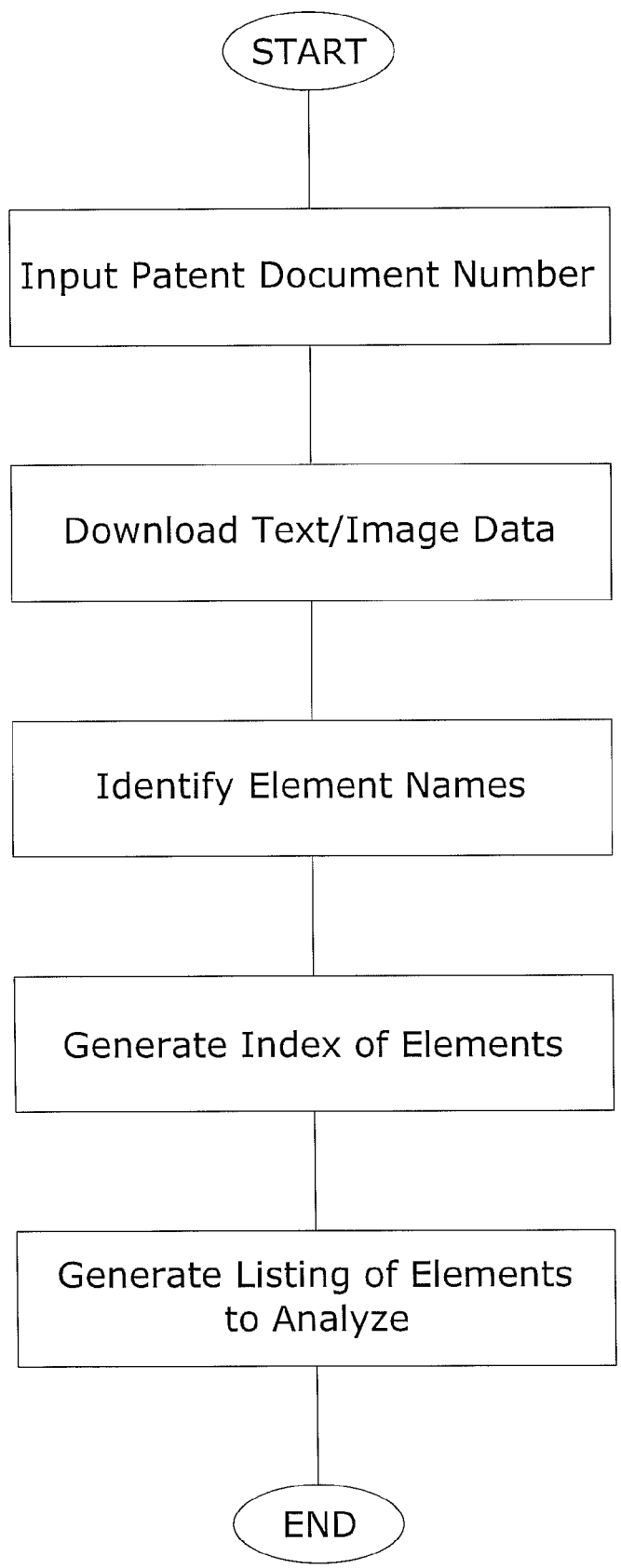
FIG. 2 is a flowchart illustrating the overall operation of the text analysis portion of the present invention.

FIG. 2 is a flowchart illustrating the overall operation of the text analysis portion of the present invention. A patent document number (e.g. patent number) is input by the user or other means into the present invention. The patent document is then downloaded utilizing known patent document downloading technology (e.g. PATENTHUNTER from Neustel Software, Inc.) or imported into the present invention by going to FILES/IMPORT FILE on the main menu. When importing a file (e.g. HTML, TXT, RTF, XML, DOC), the file is first located using a "browse" feature and then the file is imported into the present invention for analysis. It is preferable to download/import both the image and text data into the present invention, however only the text data (e.g. HTML, XML, TXT, RTF) or only the image data (e.g. PDF, TIFF, JPG) may be downloaded. In addition, patent documents being viewed by a user (e.g. using MICROSOFT INTERNET EXPLORER or MICROSOFT WORD) may also be analyzed by a plug-in into the program (e.g. right-click feature).

As shown FIGS. 2 and 4 of the drawings, the patent document number is entered into the interface of the present invention. FIG. 4 is an exemplary interface of the present invention illustrating an index of elements created for U.S. Pat. No.

5,444,333. The text data and the image data of the patent document are thereafter acquired into the present invention.

The element names are then identified within the text data of the patent document. The element names preferably are identified that have an element number behind them, however element names may be identified that do not have an element number corresponding with them.

An index of elements is thereafter generated based upon the element numbers and their corresponding element names as shown in FIGS. 2 and 4 of the drawings. The index of elements may be printed for the user to view and utilize when reviewing the patent. The index of elements is preferably a table having 2 or more columns because of the typical larger number of elements within a patent document, however the index of elements may be comprised of a listing of the elements. The index of elements preferably organizes the elements by their element numbers, however the index of elements may be organize the elements by their alphabetical order also. Special index of elements may also be created that are solely for individual figures. The index of elements may also be opened with a conventional word processor to allow for editing by the user to correct any errors in the index of elements. A listing of elements is further preferably created that may be utilized in analyzing the actual text of the patent document as discussed later herein.

2. Analyzing and Displaying Patent Document

Figure 3A:
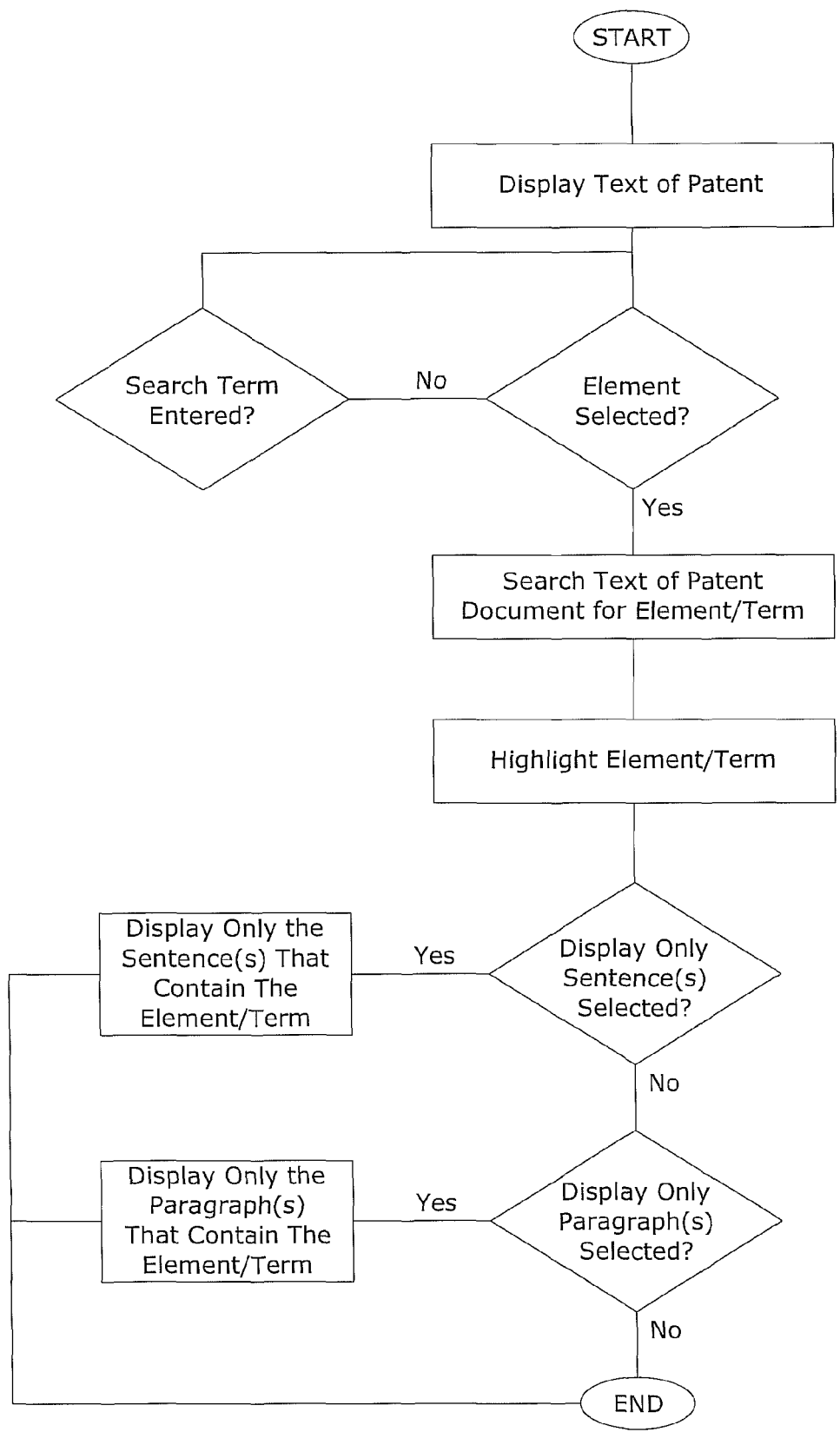
FIG. 3a is a flowchart illustrating the operation of the text analysis and display portion of the present invention.

FIG. 3*a* is a flowchart illustrating the operation of the text analysis and display portion of the present invention. The text of the patent is displayed within the present invention for the user to view along with the listing of elements for the user to select. The listing of elements preferably includes both the element number and element name. The elements may be utilized to analyze any portion of the patent document including the claims, specification and figures. In addition, the user may select a particular figure number to analyze wherein all sentences or paragraphs that contain reference to that figure will be shown.

Figure 6:
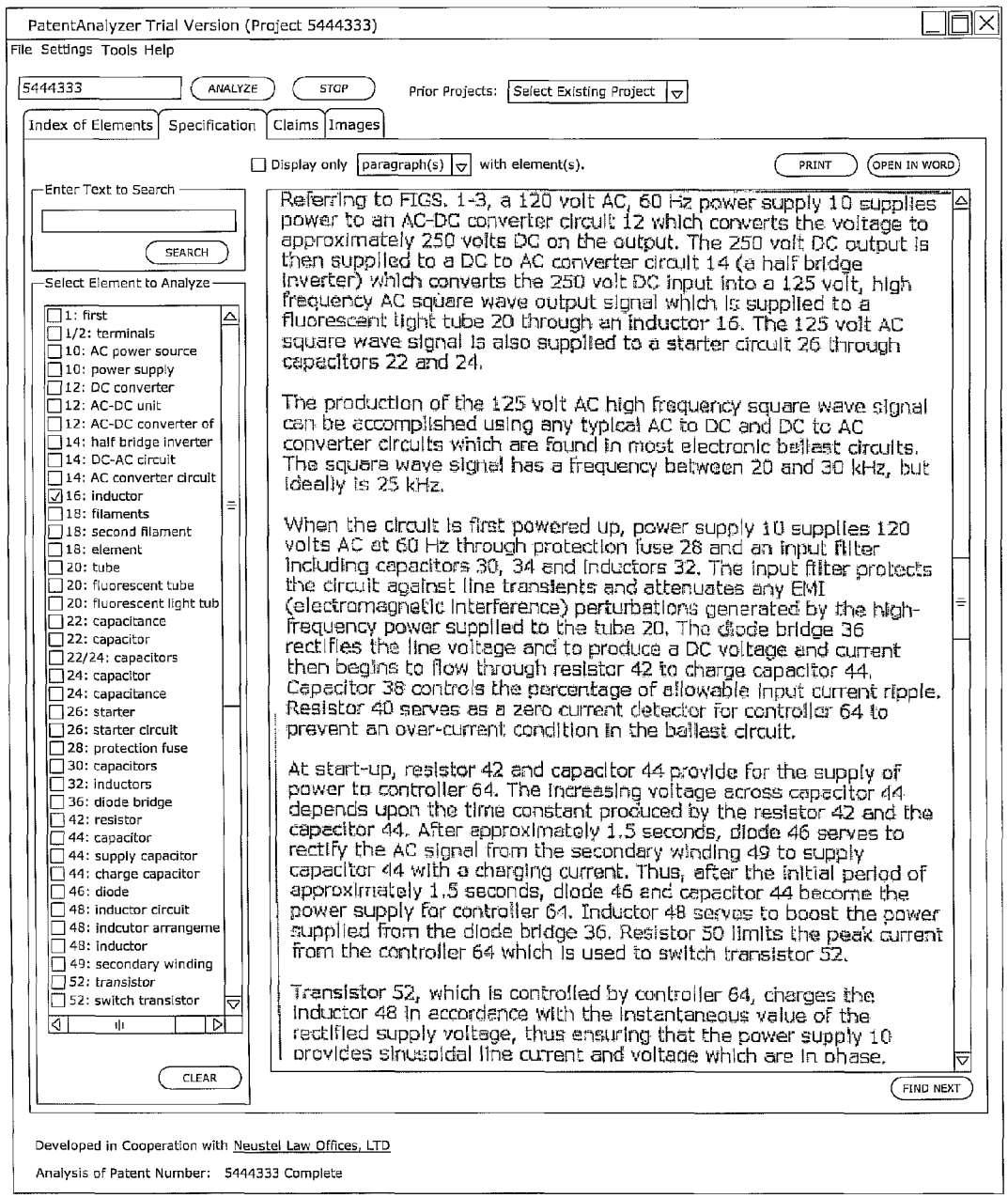
FIG. 6 is an exemplary interface of the present invention illustrating the highlighting of a selected element (inductor 16) within the text portion of U.S. Pat. No. 5,444,333.
Figure 10:
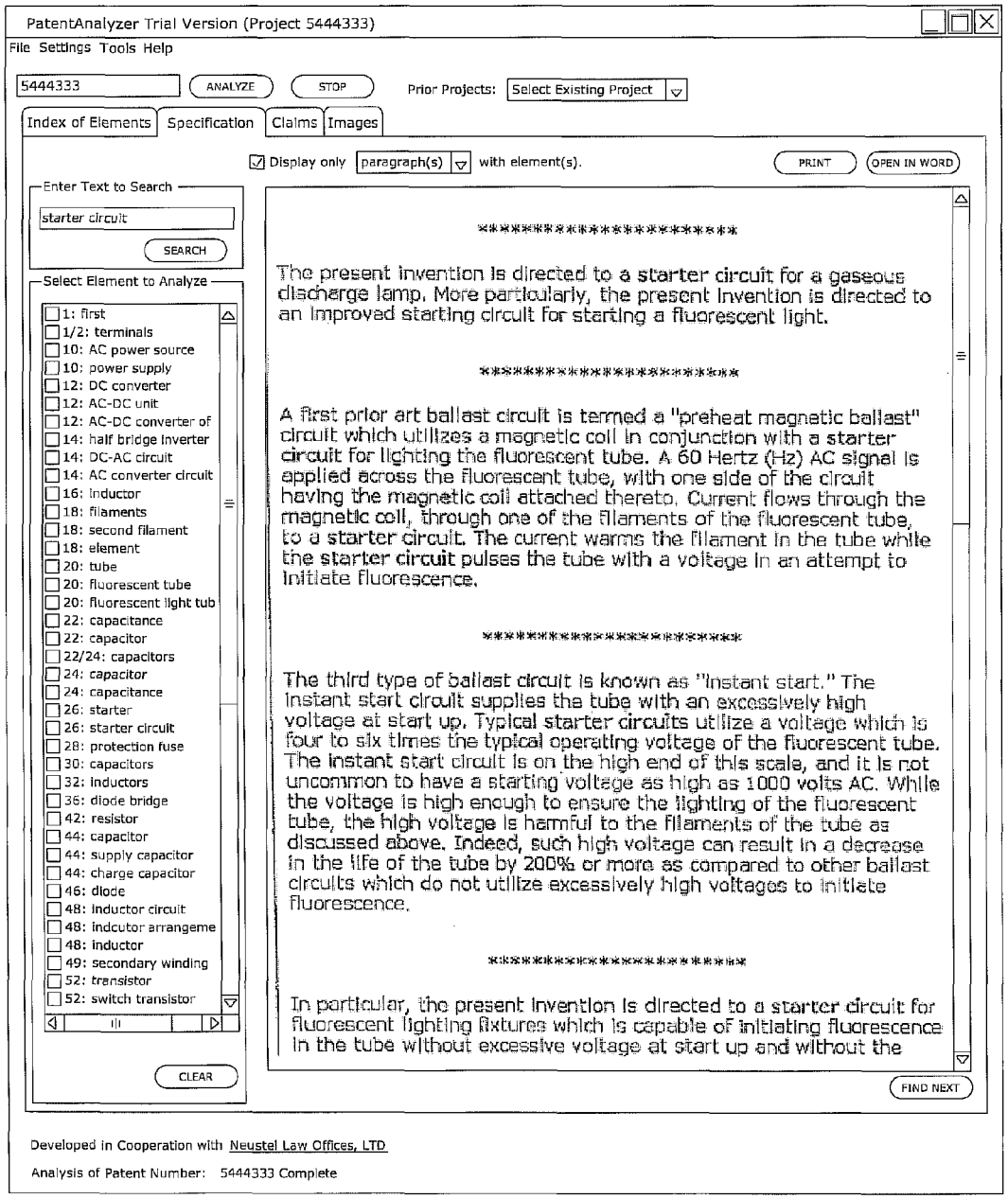
FIG. 10 is an exemplary interface of the present invention illustrating the highlighting of a search term (starter circuit) within the text portion of U.S. Pat. No. 5,444,333 and the displaying of only paragraphs containing the selected element.
Figure 11:
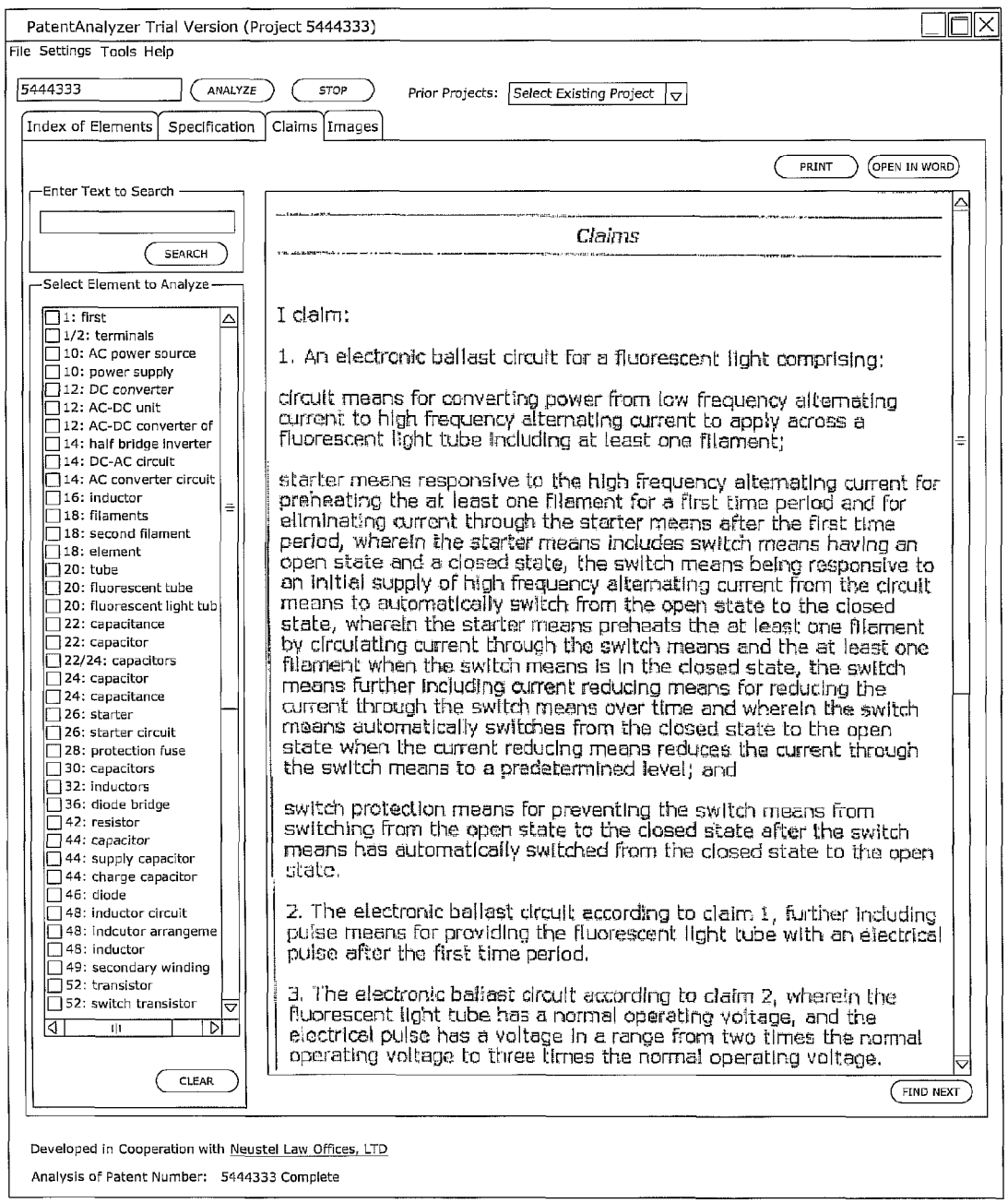
FIG. 11 is an exemplary interface of the present invention illustrating the claims of U.S. Pat. No. 5,444,333.
Figure 13:
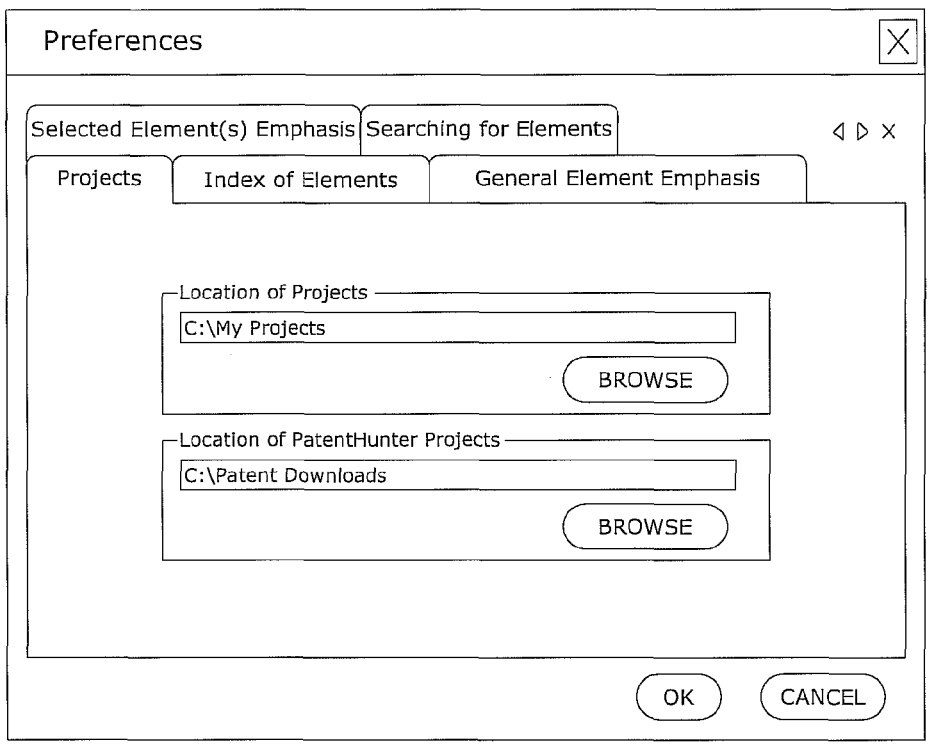
FIG. 13 is an exemplary preferences interface that allows for the modification of the file locations of products and the location of image files.
Figure 14:
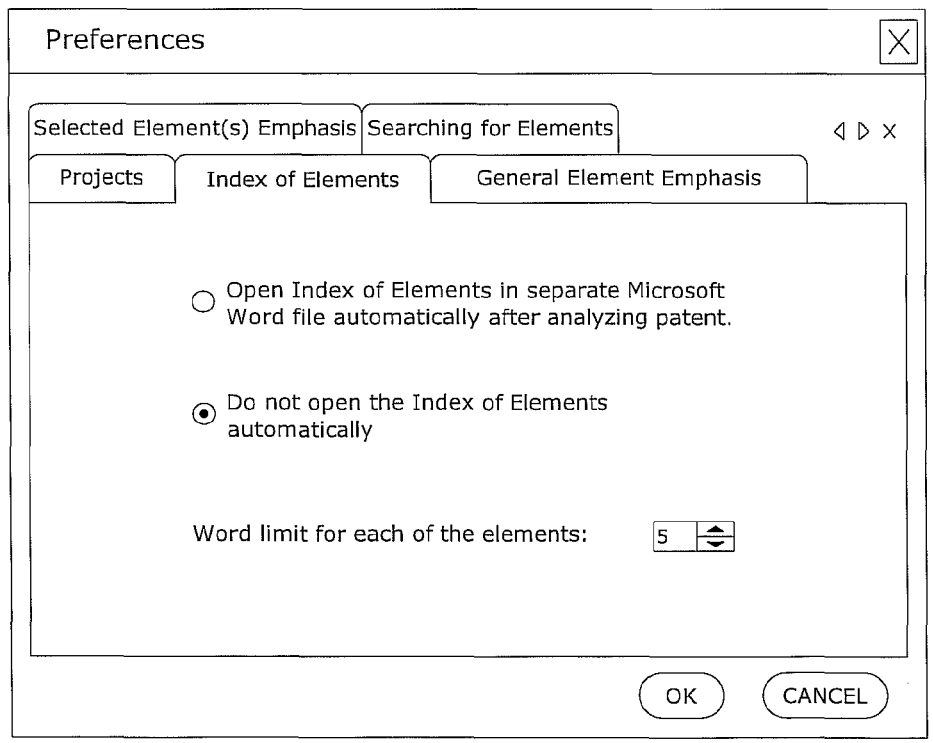
FIG. 14 is an exemplary preferences interface that allows for the selection of whether or not to automatically open the index of element after analyzing the patent, and also allows for adjusting the number of words allowed for each element name.

The user selects 1 or more elements to analyze from the listing of elements as shown in FIG. 6 of the drawings. The selected element(s) is thereafter emphasized throughout the patent text as shown in FIG. 6 of the drawings. In addition to selecting an element from the listing, the user may also enter a specific word(s) to search through the patent text and the same will be emphasized as illustrated in FIG. 10 of the drawings. The typing of the text to search may require the user to select a "search" or enter function prior to searching the patent document. Alternatively, the present invention may automatically begin searching the patent document after the entry of 1 or more characters (numbers, letters or combinations thereof) in an "on the fly" type of display. For example, if the user types "induct" the display of the present invention would emphasize all locations in the patent document that have the word "induct" within them. If the user continues to type "inductor" then the present invention would emphasize all locations in the patent document that have the word "inductor" within them. There may be a slight delay feature that waits to search the document until a preset/adjusted period of time has passed since the typing of the last character (e.g. 2 seconds).

Figure 15:
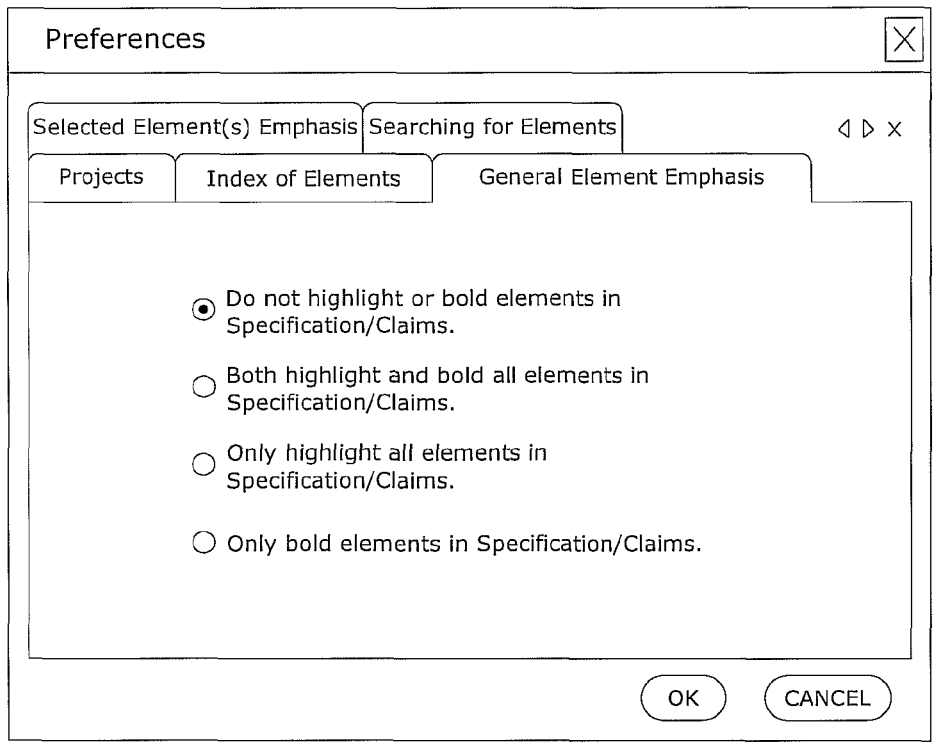
FIG. 15 is an exemplary preferences interface that allows for adjustment of the method of emphasizing all of the element names throughout the patent document.
Figure 16:
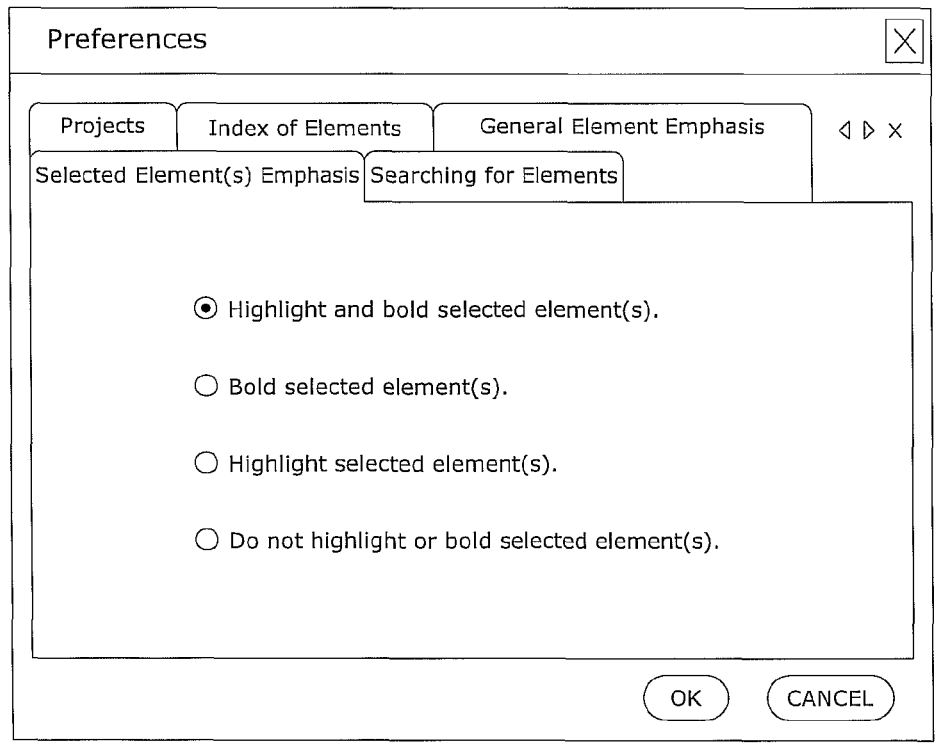
FIG. 16 is an exemplary preferences interface that allows for adjustment of the method of emphasizing selected element name(s) throughout the patent document.

The emphasis of the selected element(s) is preferably comprised of highlighting and bolding as shown in FIG. 6 of the drawings. However, the emphasis of the selected element(s) may be comprised of highlighting with a color (e.g. yellow), bolding, italicizing, underlining or any combination thereof that may be predetermined and/or adjusted by the user in the preferences section. In addition to emphasizing only the selected element(s), the user may adjust the present invention to automatically emphasize all elements identified throughout the patent text as shown in FIG. 15 of the drawings.

Figure 7:
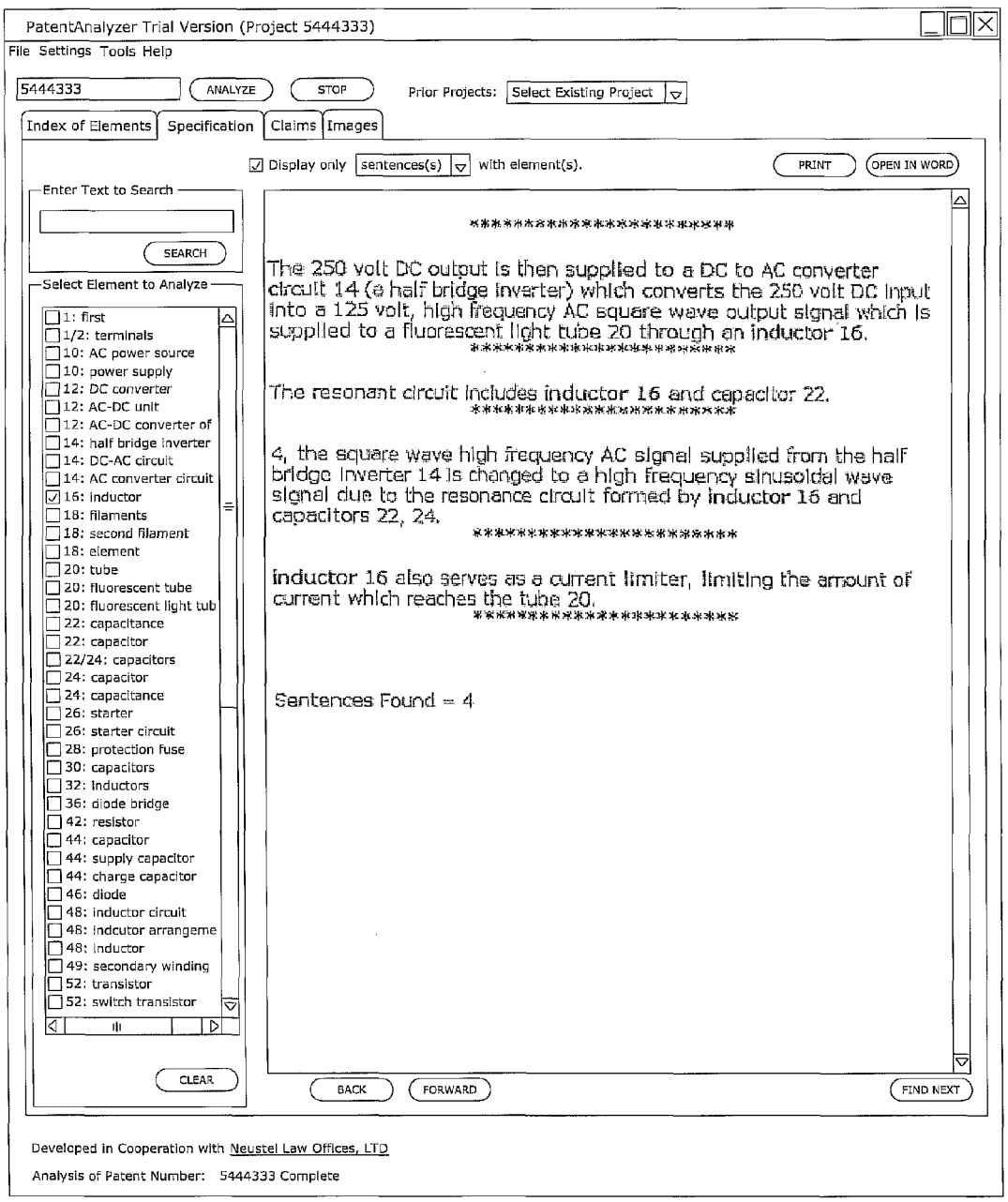
FIG. 7 is an exemplary interface of the present invention illustrating the highlighting of a selected element (inductor 16) within the text portion of U.S. Pat. No. 5,444,333 and the displaying of only sentences containing the selected element.
Figure 8:
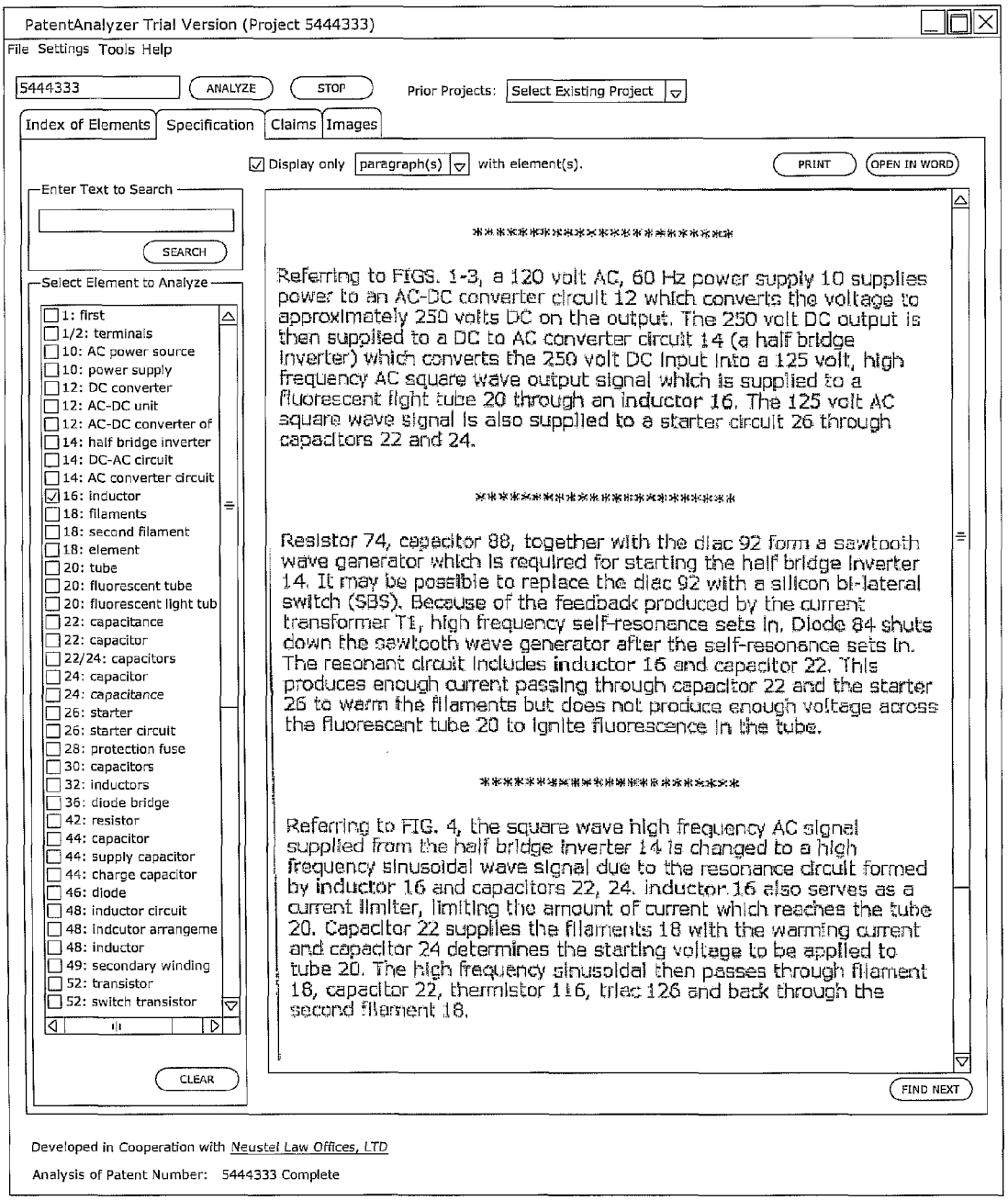
FIG. 8 is an exemplary interface of the present invention illustrating the highlighting of a selected element (inductor 16) within the text portion of U.S. Pat. No. 5,444,333 and the displaying of only paragraphs containing the selected element.

The user also has the option of displaying only the sentence(s) or paragraph(s) containing the selected element(s) (or entered terms) to quickly locate the important portions of the patent document that discuss the element(s) the user is reviewing as shown in FIGS. 3*a*, 7 and 8 of the drawings. When this feature is selected, only the sentence(s) or paragraph(s) containing the selected element(s) (or entered terms) will be displayed. A separator (e.g. ************* or horizontal line) is preferably positioned between each of the individually displayed sentences/paragraphs. In addition, it is preferable to display the heading of the patent document that each sentence/paragraph is from (e.g. BACKGROUND OF INVENTION, SUMMARY OF INVENTION, ABSTRACT, DETAILED DESCRIPTION OF INVENTION, CLAIMS). It is also preferable for the user to be able to "expand" the displayed text to show the sentence/paragraph before/after the displayed sentence/paragraph by using a right-click feature or including an icon within the displayed text for the user to select (e.g. +/−).

Figure 17:
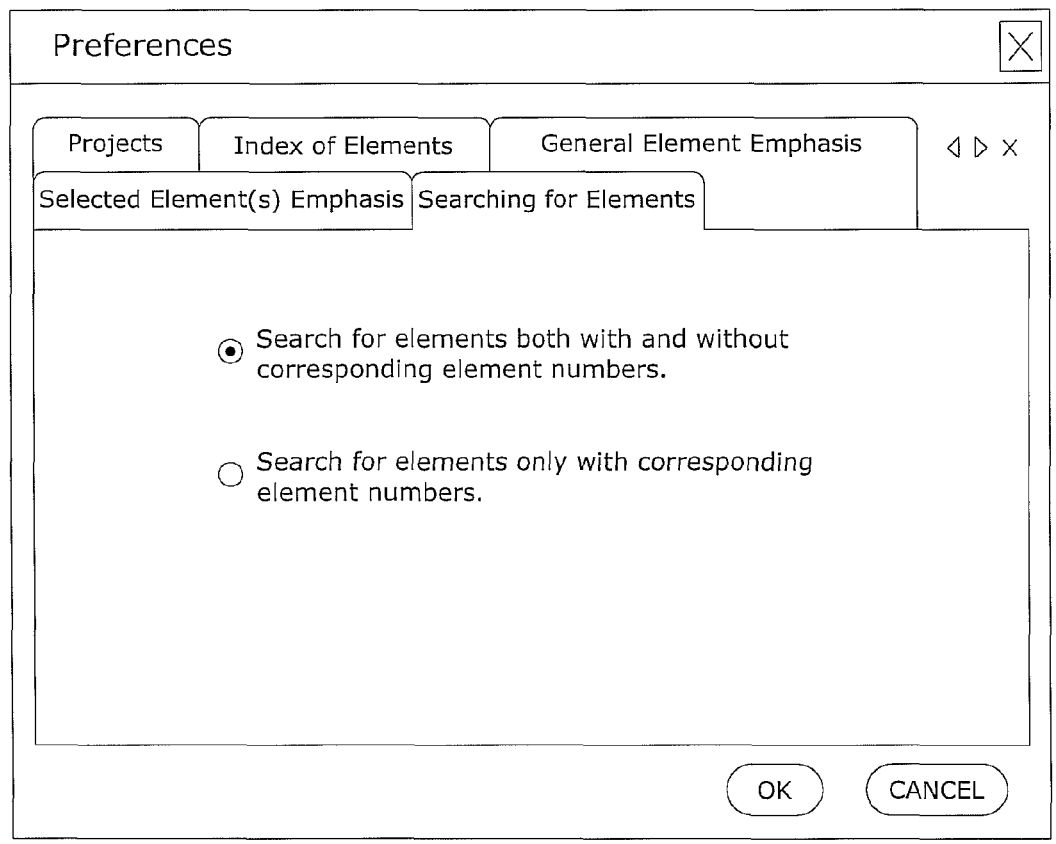
FIG. 17 is an exemplary preferences interface that allows for adjustment of the method of searching for element names within the patent document.

FIG. 7 illustrates where the user has selected element number 16 (inductor). The present invention searches all locations within the patent document that include both the element name "inductor" followed by the element number "16". Since only sentences are to be displayed in FIG. 7, only the sentences containing "inductor 16" as displayed within the present invention for the user to quickly view and read. FIG. 8 illustrates this displaying the paragraphs that contain "inductor 16" within them. If the user has selected the option in FIG. 17 that allows for emphasis of the element name throughout the patent document regardless if it has an element number or not, then all locations that contain the word "inductor" will be emphasized.

Figure 9:
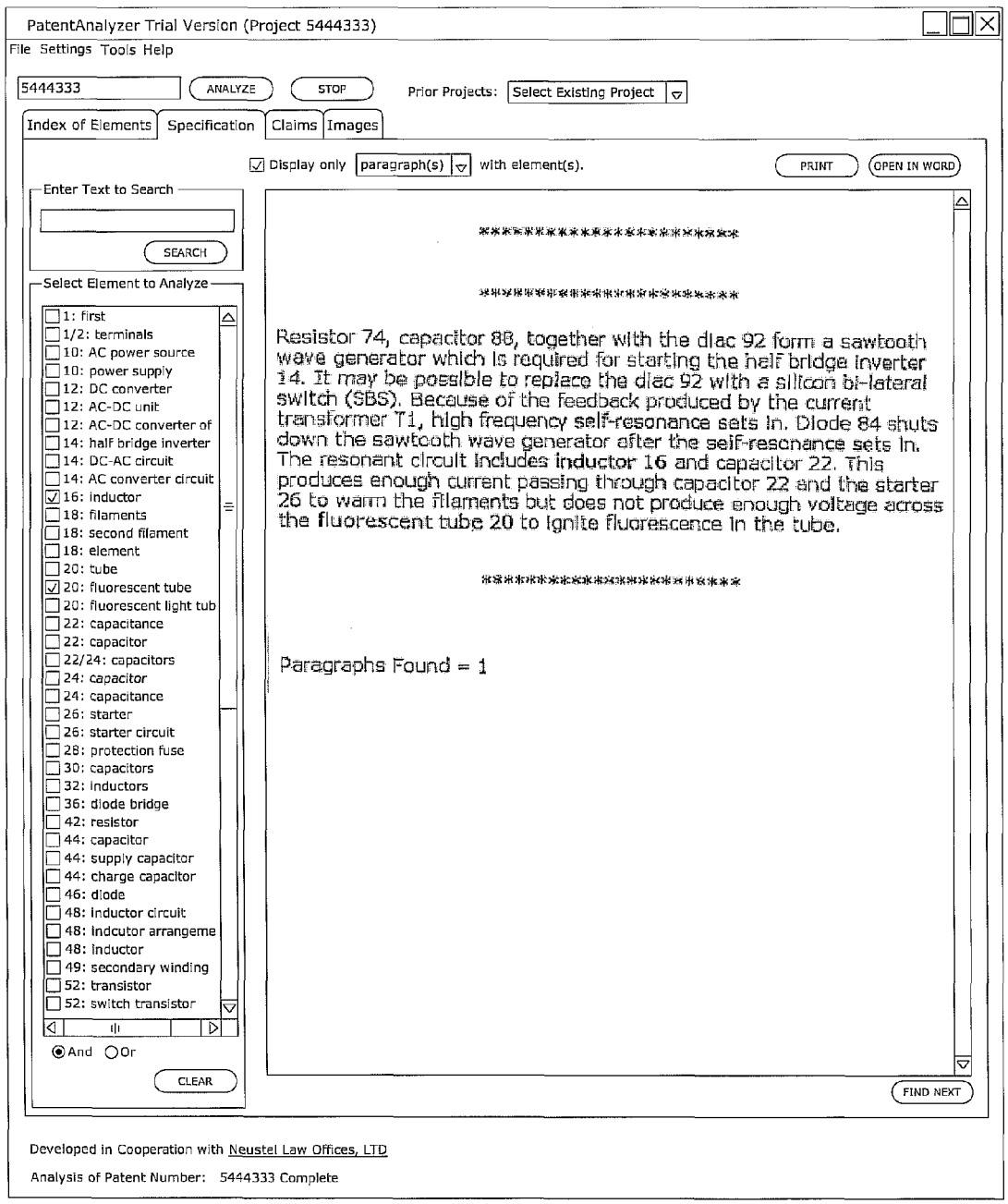
FIG. 9 is an exemplary interface of the present invention illustrating the highlighting of multiple selected elements (inductor 16 and fluorescent tube 20) within the text portion of U.S. Pat. No. 5,444,333 and the displaying of only paragraphs containing both of the selected elements.

FIG. 9 illustrates the selection of two elements (inductor 16 and fluorescent tube 20). Only the paragraphs containing these two elements are displayed as shown in FIG. 9 of the drawings.

The selection of multiple elements to search within the patent document is preferably combined using an "and" search connector. However, the user may select an "or" connector which will show all paragraphs/sentences that contain either of the selected elements as shown in FIG. 9 of the drawings. The "or" connector is useful in situations where there may be multiple variations of a particular element name (e.g. "tube 20", "fluorescent tube 20" and "fluorescent light tube 20" in FIG. 9).

The user can clear the element(s) being searched and may choose new elements to search. The user may also select "back" and "forward" features to go back or forward with respect to their "history" of element searches which reduces the amount of time the user has to expend when searching through various element names (see the Back and Forward buttons in FIG. 7). A detailed history may also be shown that lists all of the elements and combination of elements the user has researched within the patent document to allow the user to reselect the same.

The user can copy/paste, open in an editable document and/or print the sentence(s)/paragraph(s) displayed for one or more selected elements.

3. Identifying Element Names

Figure 12:
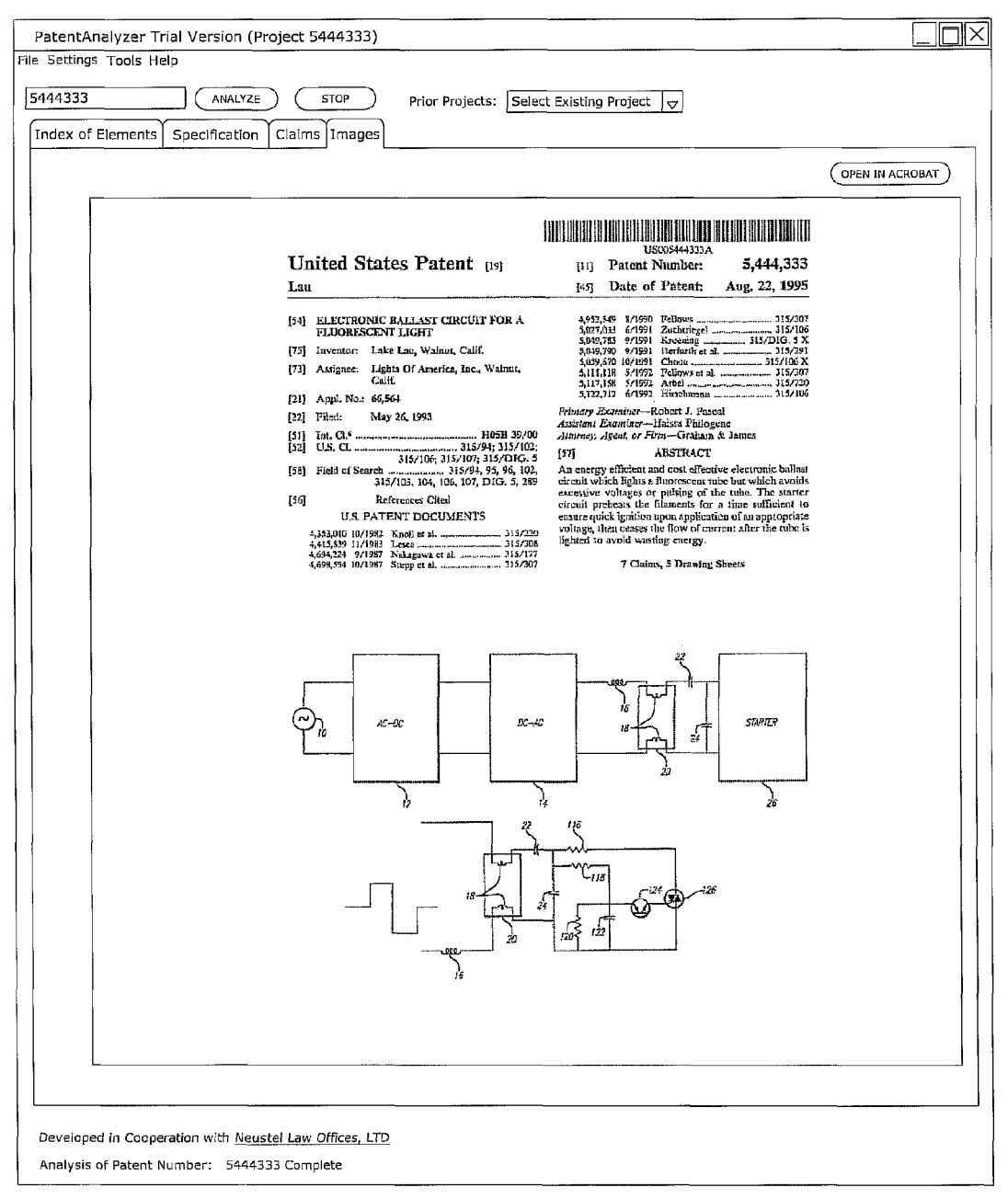

A significant feature of the present invention is the ability to identify the "element names" used to identify/label each of the element numbers" (i.e. the reference numerals used in the patent drawings). A patent document may have only a few elements or hundreds of elements in it. Each of the elements is typically identified in the patent drawings with a reference numeral as shown in FIG. 12 of the drawings.

Figure 3B:
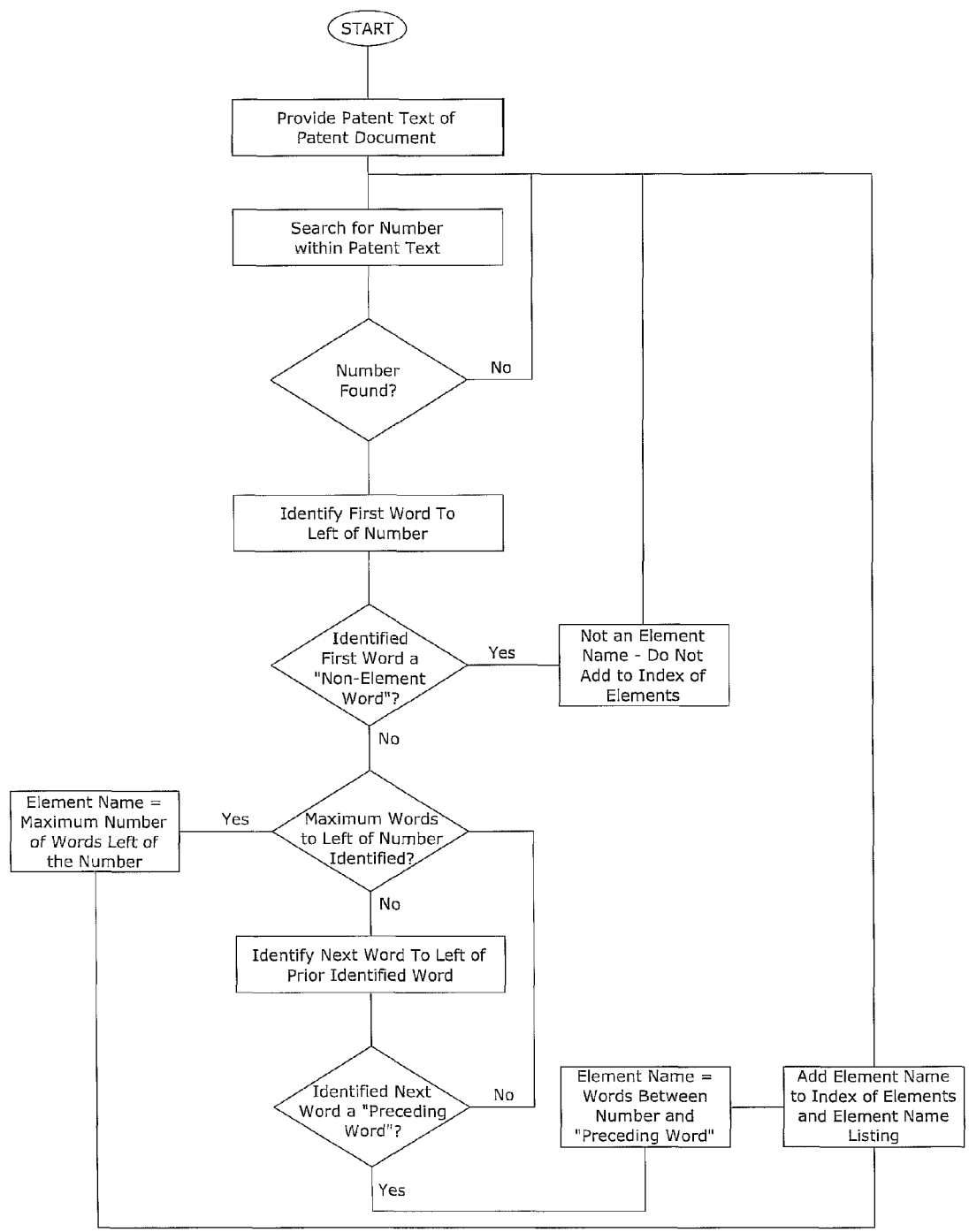
FIG. 3b is a flowchart illustrating the identification of element names within a patent document.

FIG. 3b is a flowchart illustrating the identification of element names within a patent document. Below is a basic step-by-step identification of element names within a patent document:

Step #1: Identify an Element Number

Step #2: Identify word(s) to the left of the Element Number until either a Preceding Word or a paragraph break is found (or a period followed by at least one space for a sentence).

Step #3: Check to ensure that a Non-Element Word is not directly next to the Element Number (if so, this is not an element name).

i. Element Number

An "Element Number" is a number (or a number followed by a letter or other character immediately thereafter without a space) that is comprised of one or more digits (Example: "As shown in FIG. 12, the metal hammer 12a is used to . . ." the "12a" is the Element Number"). The element number may be comprised of 1, 2, 3, 4 or more numbers along with other letters/characters positioned immediately thereafter (e.g. 12, 20a, 20b, 30', 30").

ii. Preceding Words

A "Preceding Word" is a word (or phrase or character) that immediately precedes an element name (Example: "As shown in FIG. 12, the metal hammer 12a is used to . . ." the word "the" is a Preceding Word). The present invention utilizes a database of preceding words to be used in identifying preceding words within the patent document. Various types of words are always a preceding word (e.g. a, an, the, are, illustrates, produces, represents, then, to, utilizes, when, within, etc.). Certain phrases (e.g. "by cooking"), characters (e.g. comma, semi-colon) and formatting (e.g. paragraph break) may also be used as "Preceding Words".

The preceding words are words/phrases are words/phrases that are typically not utilized by a patent applicant to identify/label elements of the invention or other items. The types of words preferably used as "Preceding Words" in the database are articles (e.g. a, an, the, said), prepositions (above, near, at, by, after, with, from), conjunctions, (e.g. and, or, because, but, or, since, so, until, while, both, not only, either, whether, after, before, although, though, consequently, furthermore, instead, conversely), verbs (e.g. have, run, be, do, creates, directed, executed, compiled, adverbs (e.g. how, where, earlier, next, then, first, second, third, fourth, there), contractions (e.g. can't, don't, isn't), pronouns (e.g. I, me, she, who, he, her, him, it, you, they, them), some punctuation marks (except "-" or """), expletives (e.g. of course, at least, in fact, clearly, definitely, certainly, naturally), relative adjectives (e.g. which, that, what, whichever, whatever) and symbols (!, /, *, @, $). The database of preceding words is used to determine if a word to the left of the element number identified is part of the element name or is a preceding words that serves as the left-most stopping point for determining the element name. There are exceptions to this general rule which may require modification of the database of words to accurately reflect words that typically precede an element name.

The database of preceding words may be updated periodically to reflect modern terminology utilized in patent documents. The database of preceding words may also be edited by the user to allow for the addition or deletion of preceding words if they are experiencing problems with the current listing of preceding words.

iii. Element Names

The "Element Name" is the actual name of the element which can be one or more words. The Element Name is the word(s) positioned between the Preceding Word and the Element Number (Example: "As shown in FIG. 12, the metal hammer 12a is used to . . ." the Element Name is "metal hammer" because the Element Number is "12a" and the Preceding Word is "the"). An element name is any label used by the patent application to identify a feature, structure or other thing contained in the patent drawings (or not shown in the patent drawings. The element name typically is followed by an element number however this is not required. The type of words preferably utilized for elements names include nouns (e.g. hammer, handle, signal) and adjectives (e.g. big, cold, blue).

iv. Non-Element Words

A "Non-Element Word" is any word, phrase or character that would not typically immediately precede an element number. For example, a Non-Element Word may in fact typically precede a quantitative number or may be a phrase commonly utilized to identify indicia in the drawings (e.g. approximately, subtracts, multiplies, averages, January, December, by arrows, Figure, Figures, patent number, reference numeral). A Non-Element Word database is maintained within the present invention. The Non-Element Word database typically includes a substantial portion of the Preceding Words (see above), however the Non-Element Word database may include additional words based upon word usage in patent documents (or some removed). Non-Element Words are preferably comprised of proper nouns (e.g. Tom, Delaware, Titanic), certain punctuation marks (e.g. ?, ;), symbols (!, /, *, @, $), verbs (e.g. run, cut) and months (e.g. January, December).

As shown in FIG. 3b of the drawings, the present invention first identifies a number within the patent document (some portions of the patent document may automatically be ignored such as the cover page or the BACKGROUND OF INVENTION). Once a number is found, the first word to the left of the element number is identified. If the first word is a "Non-Element Word" (i.e. a word, phrase or character that would not typically precede an element number) then the number is disregarded. The database of "Non-Element Words" is preferably periodically updated and may also be directly edited by the user at anytime.

If the word(s) to the left of the number is not a "Non-Element Word" (based on comparing with the words/phrases of the Non-Element Word database), then the number is then determined to be an "Element Number" and the present invention continues to identify the Element Name by identifying the word(s) to the left of the Element Number until either (1) a "Preceding Word" is identified (based on comparing with words in the Preceding Word database) or (2) the maximum number of words is reached for the element name. If a Preceding Word is identified to the left of the Element Number, then the Element Name is equal to the words between the Element Number and the Preceding Word (excluding the Preceding Word of course). If a Preceding Word is not identified after a present or user adjusted number of words to the left of the Element Number (e.g. 5 words), then the present invention terminates further searching to the left and accepts the maximum number of words to the left of the element number as the element name. The maximum number words to the left may range from 1-10, however it is preferable that the maximum number of words be set to either 3, 4 or 5 maximum words. The Element Name is thereafter added to the index of element and the element name listing database (along with the corresponding Element Number). Various database formats may be utilized to store the Element Name and Element Number.

This process continues until each of the element numbers have been identified and the corresponding element name is identified.

4. Resolving Element Name Conflicts

Some patent documents may have multiple variations of element names within them for various reasons. For example, U.S. Pat. No. 5,444,333 uses two element names for element number 20: "tube 20", "fluorescent tube 20" and "fluorescent light tube 20" as shown in FIG. 9 of the drawings. It is desirable to have a solution for resolving these conflicting variations to avoid 2 or more element names being used for an individual element number.

Figure 3C:
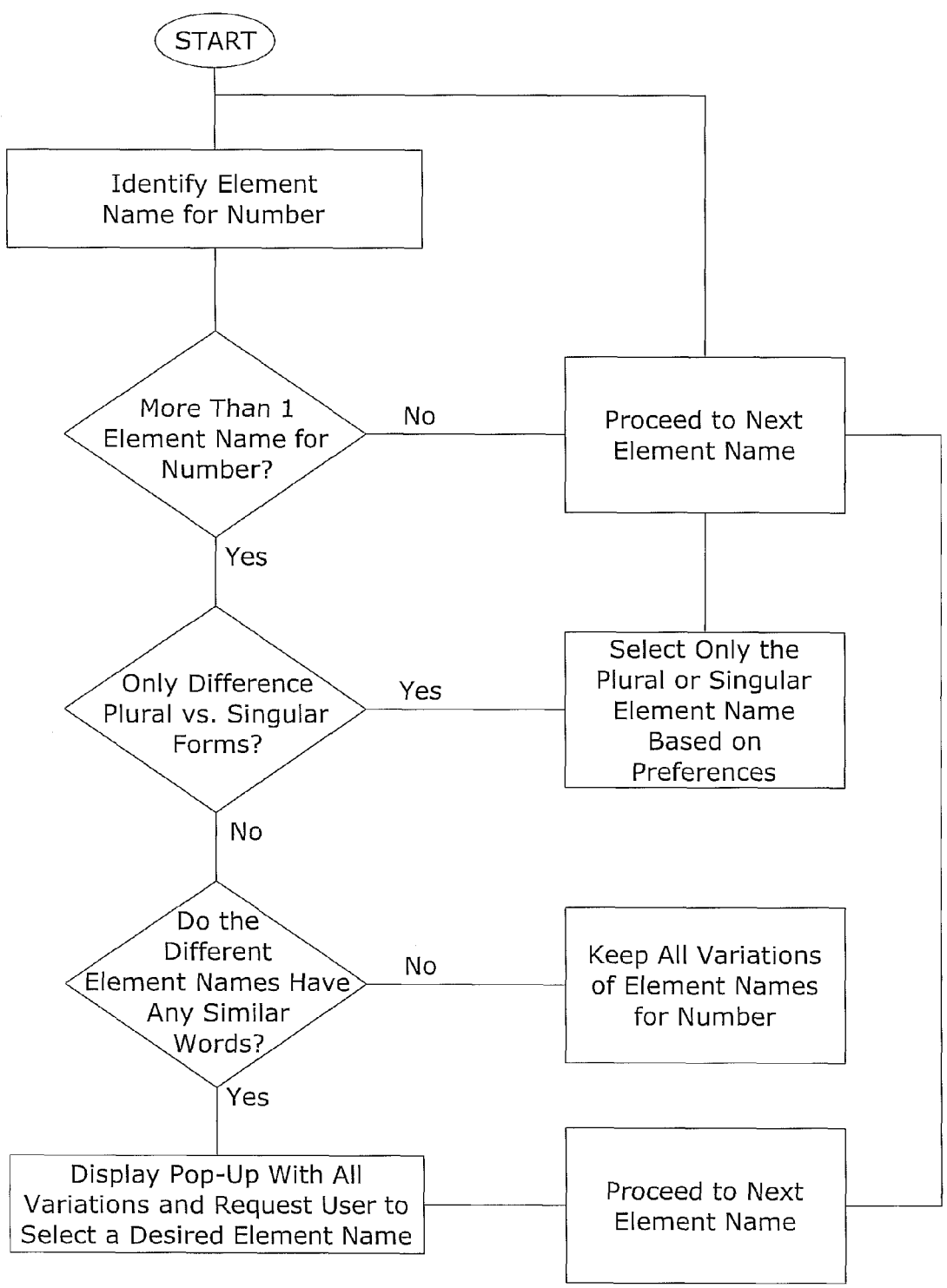
FIG. 3c is a flowchart illustrating a first process for resolving multiple element name variations for a single element number that utilizes the user's selection of a desired element name.

FIG. 3c is a flowchart illustrating a first process for resolving multiple element name variations for a single element number that utilizes the user's selection of a desired element name. As shown in FIG. 3c, if the only difference between the variations is a plural vs. singular form, then the present invention automatically selects only one of the variations based upon the preset or user selected option (e.g. the user may want the plural form to always be selected). If the variation is more than just a singular/plural form usage, then the present invention determines if there are any similar words in all of the variations. If there are no similar words, then the present invention will keep all of the variations (or ask the user to select one) and continues to the next element name. If there are similar words in all of the element names which is typically the case, then a pop-up or other selection option is displayed requesting the user to select which variation of the element name they would like to use. The selected variation by the user is thereafter used as the element name. It can be appreciated that the plurality vs. singular test does not have to be performed.

Figure 3D:
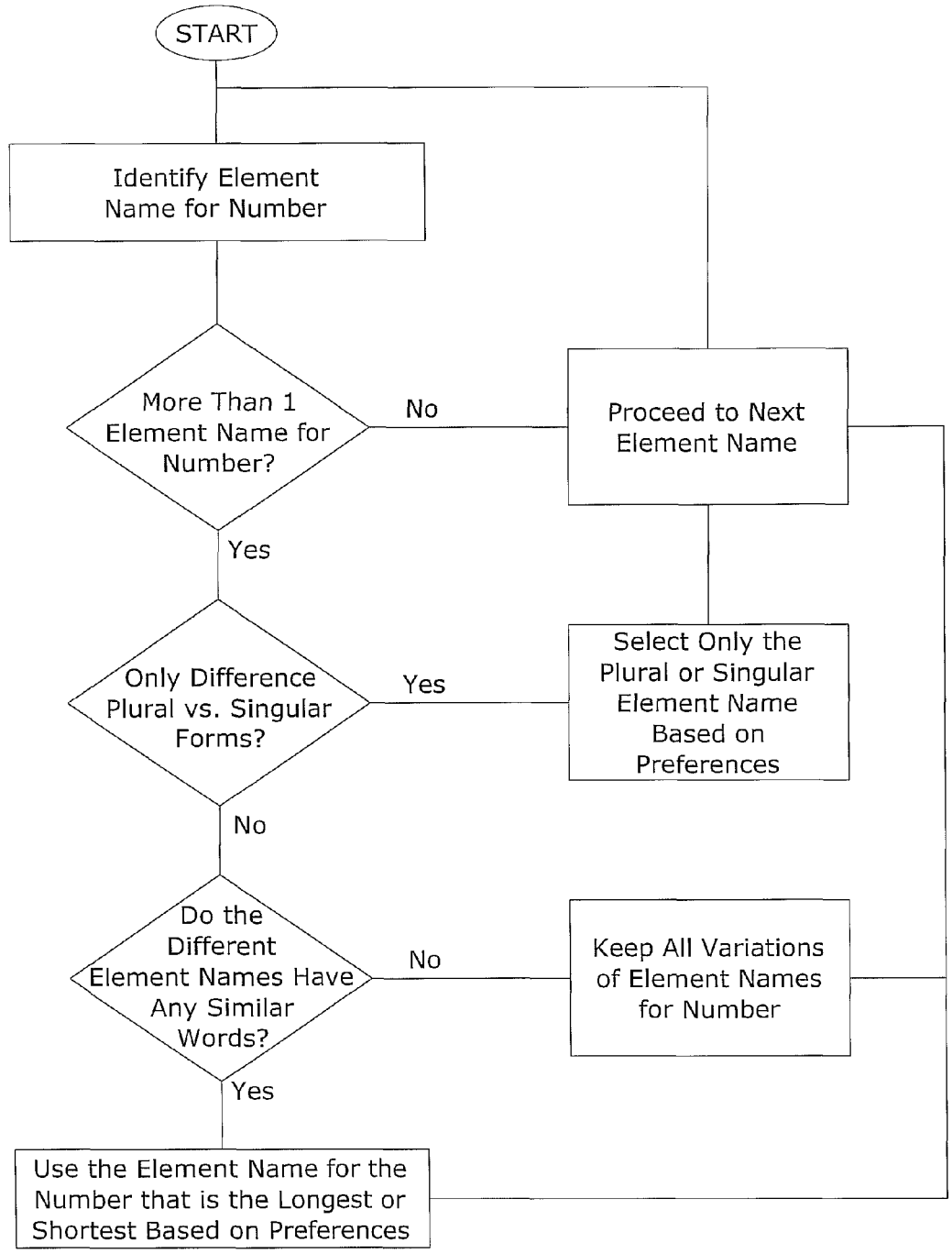
FIG. 3d is a flowchart illustrating a second process for resolving multiple element name variations for a single element number by using the element name from the variations that is either the longest or shortest based on a preference setting.

FIG. 3d is a flowchart illustrating a second process for resolving multiple element name variations for a single element number by using the element name from the variations that is either the longest or shortest based on a preference setting. For example, if the user wants the longest element name (i.e. the most words) to be used, the present invention chooses the element name that is the longest. If 2 or more element names are the longest then the user is preferably prompted to choose which one to use.

Figure 3E:
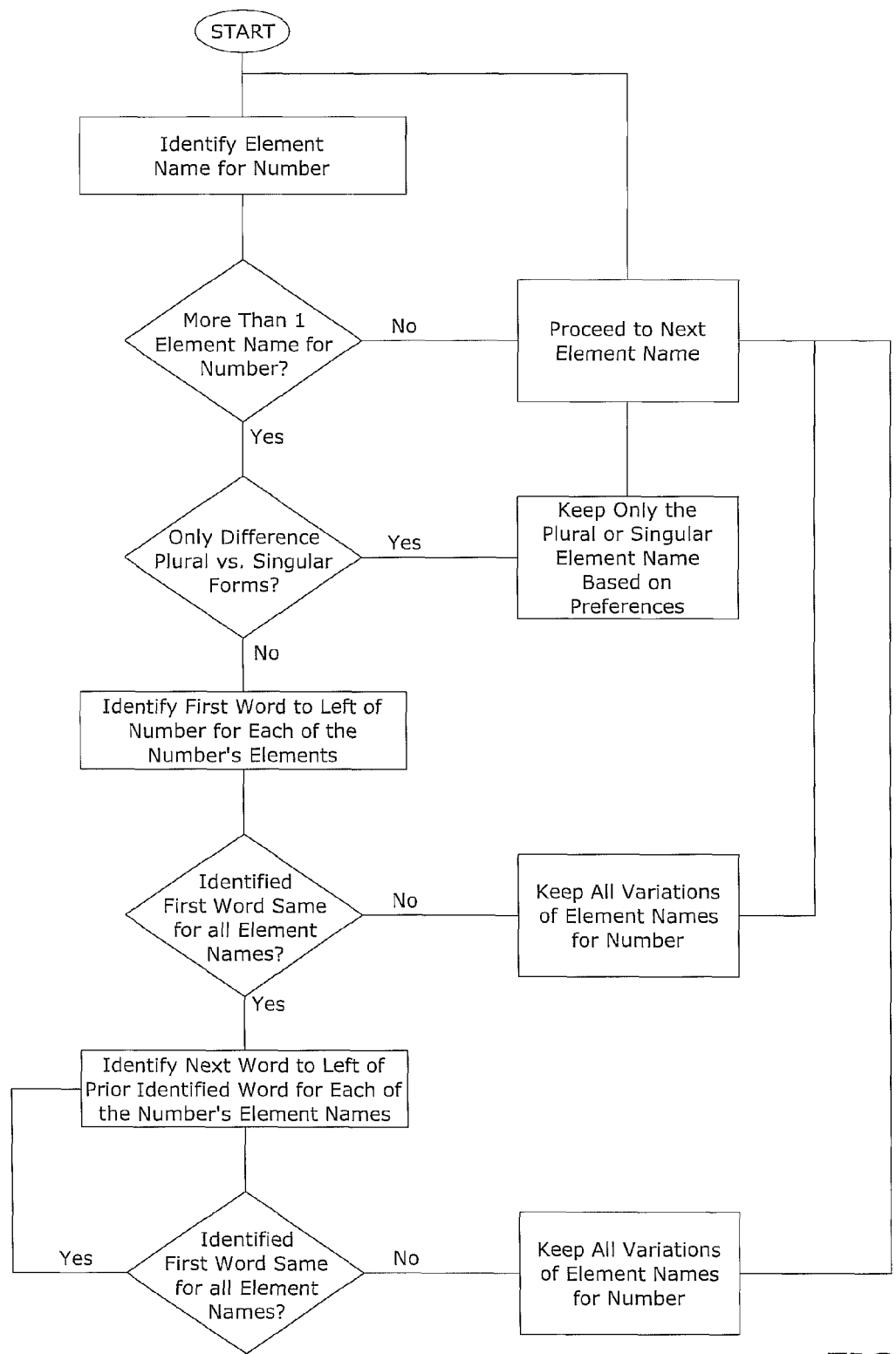
FIG. 3e is a flowchart illustrating a third process for resolving multiple element name variations for a single element number by identifying the commonly shared words immediately to the left of the number in each of the element name variations.

FIG. 3e is a flowchart illustrating a third process for resolving multiple element name variations for a single element number by identifying the commonly shared words immediately to the left of the number in each of the element name variations. For example, in U.S. Pat. No. 5,444,333, the element name that would be used for element number 20 would only be "tube" since that is the only commonly shared word to the left element number (the $2^{nd}$ to the left word is different). Alternatively, the present invention may identify the element name variation that the other variations use the words in and thereby eliminates the other element name variations as having superfluous word(s) in them.

Figure 3F:
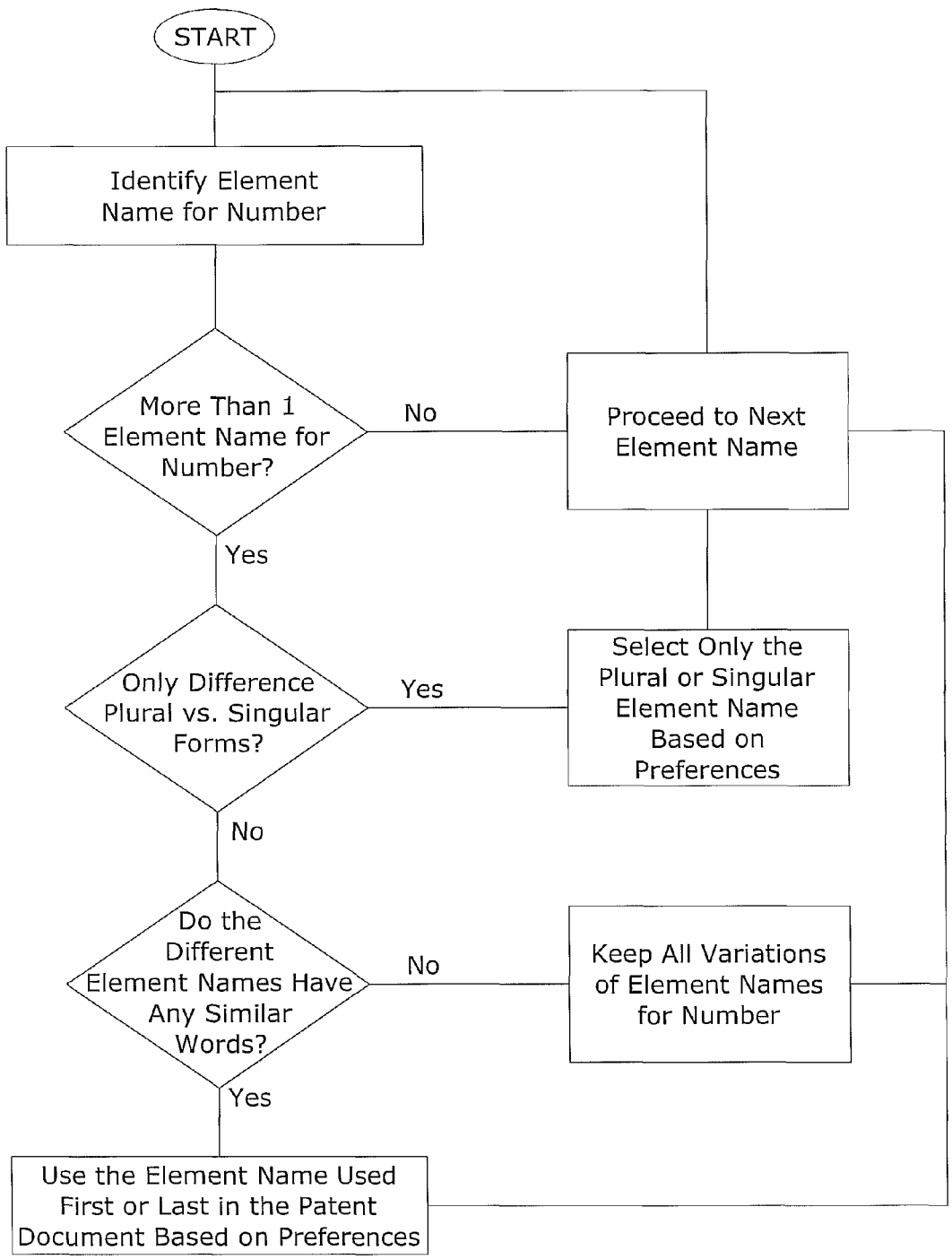
FIG. 3f is a flowchart illustrating a fourth process for resolving multiple element name variations for a single element number by using the element name from the variations that is used first or last within the patent document based on a preference setting.

FIG. 3f is a flowchart illustrating a fourth process for resolving multiple element name variations for a single element number by using the element name from the variations that is used first or last within the patent document based on a preference setting. This would be preset or user selected to help simplify the selection of a single element name for each element number. For example, the user may select that when conflicting element names are found for a specific element number that only the first instance of the element name used in conjunction with the element number would be used and all other element name variations disregarded.

Figure 3G:
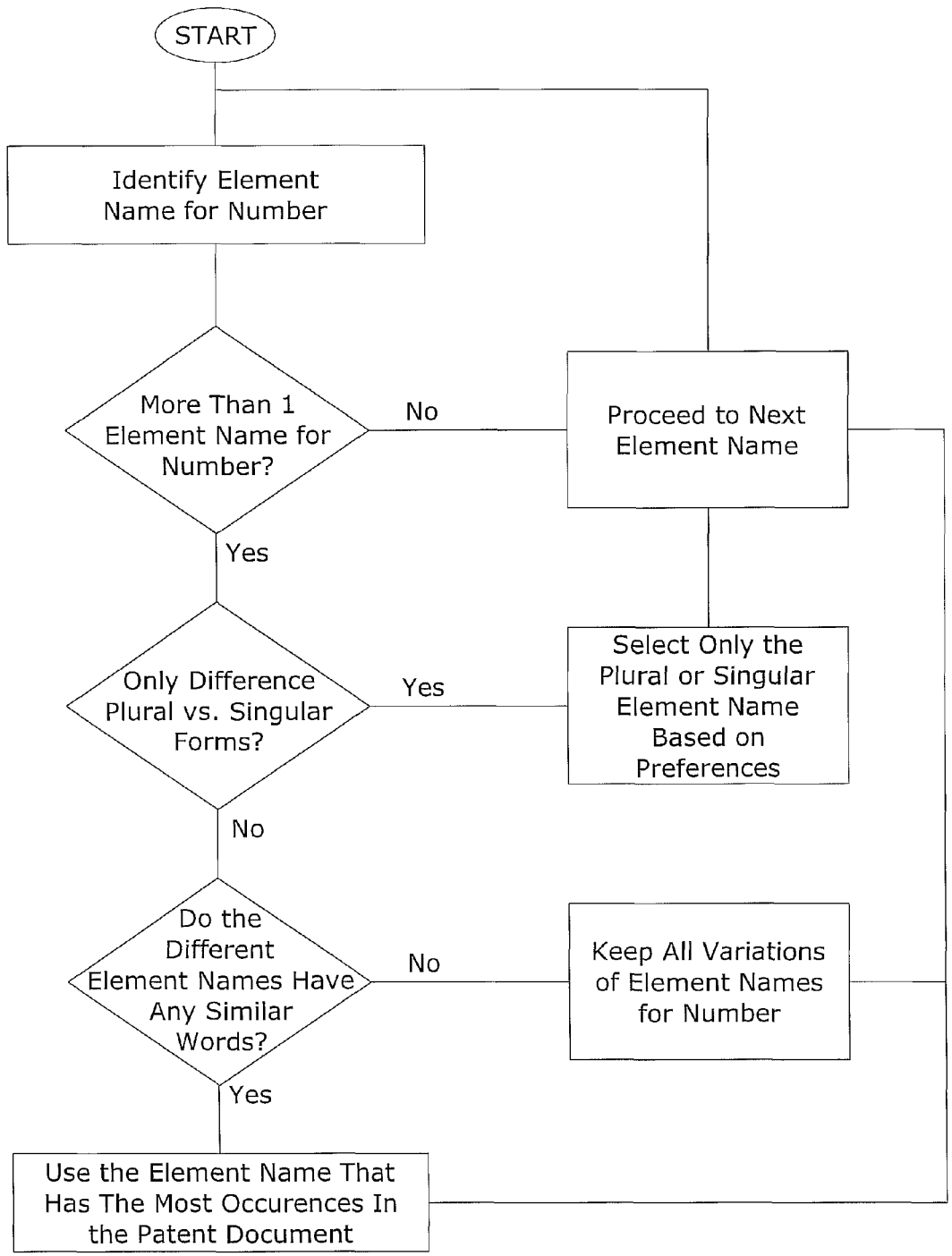
FIG. 3g is a flowchart illustrating a fifth process for resolving multiple element name variations for a single element number by using the element name from the variations that is used the most (i.e. the greatest number of occurrences) throughout the patent document.

FIG. 3g is a flowchart illustrating a fifth process for resolving multiple element name variations for a single element number by using the element name from the variations that is used the most (i.e. the greatest number of occurrences) throughout the patent document. For example, with element number 20 for U.S. Pat. No. 5,444,333, the term "tube" is used the most to identify element number 20 and would be the only element name used to identify element 20.

E. Image Analysis and Image Writing Over of Patent Documents

1. Labeling Element Numbers in Figures

Figure 18:
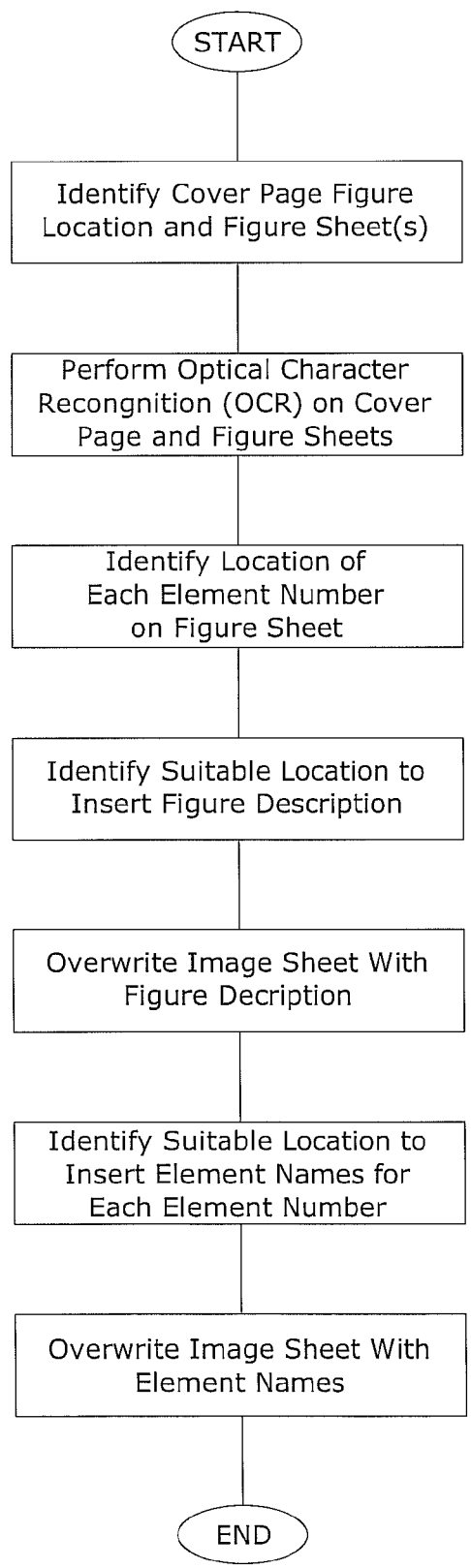
FIG. 18 is a flowchart illustrating the patent figure analysis and overwriting procedure for inserting element names and figure descriptions into the figures.

It is desirable to label the element numbers within the patent figures of the patent document (including the figure selected for the cover page). This process comprises (1) identifying the figures of the patent document, (2) performing an optical character recognition (OCR) process of the figures, and (3) creating a new image file for each of the image sheets containing the element names adjacent the element numbers and/or a description of each of the figures on each image sheet. FIG. 18 illustrates the overall process of analyzing the figures of the patent document. A "key" may also be placed on the figure sheet instead of individually labeling each of the element numbers wherein the "key" is comprised of the element names corresponding to the element numbers shown on the figure sheet for a quick reference by the user.

i. OCR Process

OCR processes have been in use for years and the present invention may utilize any conventional OCR process to identify the drawing sheets, the element numbers and/or figure numbers within each drawing sheet. The location of the element numbers is also determined during the OCR process so that a determination may be made as to where to insert the element names during the overwriting process. Various file formats may be used (e.g. TIFF, PDF) for the OCR process, however it is preferable that the TIFF file format be utilized.

During the OCR process, the header of a patent document typically will have "Sheet _ of _" along with other identifying information. Text portions of a patent document do not have this at the top of their pages, so this is used to identify the drawing sheets of a patent document. Other methods may be used to identify the drawing sheets such as (1) identifying the first set of pages with little text in them, (2) identifying the first set of pages with a lot of white space, (3) identifying the first set of pages with "FIG. _" on them, or (4) identifying the first page containing the text BACKGROUND OF THE INVENTION (or other text used on the first textual page of the patent document) thereby the pages between the cover page and the identified page are the drawing sheets.

Once the cover page (the $1^{st}$ page) and the drawing sheets are identified, the present invention then OCR's these pages to identify the location of the figures and the element numbers. During the OCR process the figures may need to be rotated 90 degrees to compensate for figures that use the landscape layout (instead of the regular portrait layout). It is important on the cover page to only OCR the lower portion of the page containing the patent figure and not the text portion of the cover page.

Once the OCR process has been performed on the drawing sheets (and the cover page), the present invention then determines a suitable location to overwrite the image with the text of the element name for each of the corresponding element numbers on the drawing sheet. It is preferable to search to the left/right/bottom/top of the specific element number to determine if a certain percentage (e.g. 5%) of the pixels in a required area to insert the text into has black/gray pixels within which indicates a non-suitable location to put the text (e.g. where a line of the figure is). It is preferable to position the text of the element name to either the left/right side of the element number as shown in FIG. 20 of the drawings. However, if there is no location available to the left/right of the element number, then the present invention considers positioning the element name above/below the element number. If no suitable location is found, the element name may either be positioned somewhere else on the drawing sheet near the element number or in a "key" for element names that have no suitable location (where the key is positioned in a convenient and "clean" location on the drawing sheet). It is preferable to place brackets or include another identifier to identify that this text is being added to the figure sheet and is not original text.

In addition, the present invention identifies the sheets containing the figure numbers (e.g. FIG. 1, FIG. 2, etc.) and then also identifies the corresponding figure description text in the BRIEF DESCRIPTION OF THE DRAWINGS section of the patent document. The present invention inserts the description of the figure either directly above/below the figure number or at the top/bottom of the page. The same process of identifying white space is preferably utilized for the figure description text insertion to ensure that the added text does not overwrite the original lines/text of the drawing sheets.

The final image file (e.g. TIFF or PDF) formed from the above process then contains the figure descriptions added to each drawing sheet and/or identification of the element numbers by element name as shown in FIG. 20 of the drawings. FIG. 19 illustrates an index of elements created using the present invention for U.S. Pat. No. 6,793,429 referred to hereinafter as "the '429 patent."

After sheet 2 of the '429 patent is OCR'd, the figure descriptions added and the element names added, FIG. 21 provides an exemplary illustration of what the user will see (and be able to print).

2. Adding Key of Elements for Figures

Instead of identifying the element name for each element number directly next to the element number in the drawing sheets, a simple "key" of elements may be added to each drawing sheet containing the element names for the element numbers identified on the particular drawing sheet.

3. Overwriting Abstract of Cover Page with Element Numbers Included

It is preferable to identify the Abstract text in the text portion of the patent document and insert the element numbers into Abstract text and then overwriting the image file of the cover page with the text of the Abstract text with numbers.

4. Interactive Patent Figures

It is preferable to make the image files for the patent figures "interactive" wherein if the user passes over or selects an element name/number that the corresponding sentence(s)/paragraph(s) containing the element name/number are displayed in a pop-up or other convenient manner. The element numbers/names may be comprised of a hyperlink or other active item that allows for selection of the same. For example, in the '429 patent described above, if the user selects (e.g. right-clicks) upon element number 24 in FIG. 3, the following text would be displayed to conveniently and immediately show the user what the patent document says about that particular element number (see FIG. 21 also):

Chalk holder 12 also comprises at least one, and preferably at least two, slots 24 disposed along a portion of the longitudinal axis of the chalk holder for accepting ramps 16 in sliding engagement.

Moreover, it will be apparent to those of ordinary skill in the art that the slots 24 and ramps 16 may be configured so as to provide a lock against pressing the chalk holder axially within the outer holder to release the chalk.

In addition, if the user selects the figure number itself, all locations in the patent document that discuss the selected figure number will be displayed in a pop-up. For example, if "FIG. 3" was selected all sentences or paragraphs(s) would be shown that contain reference to "FIG. 3" to show the user the discussion regarding that particular figure.

F. Graphical User Interface

Figure 22:
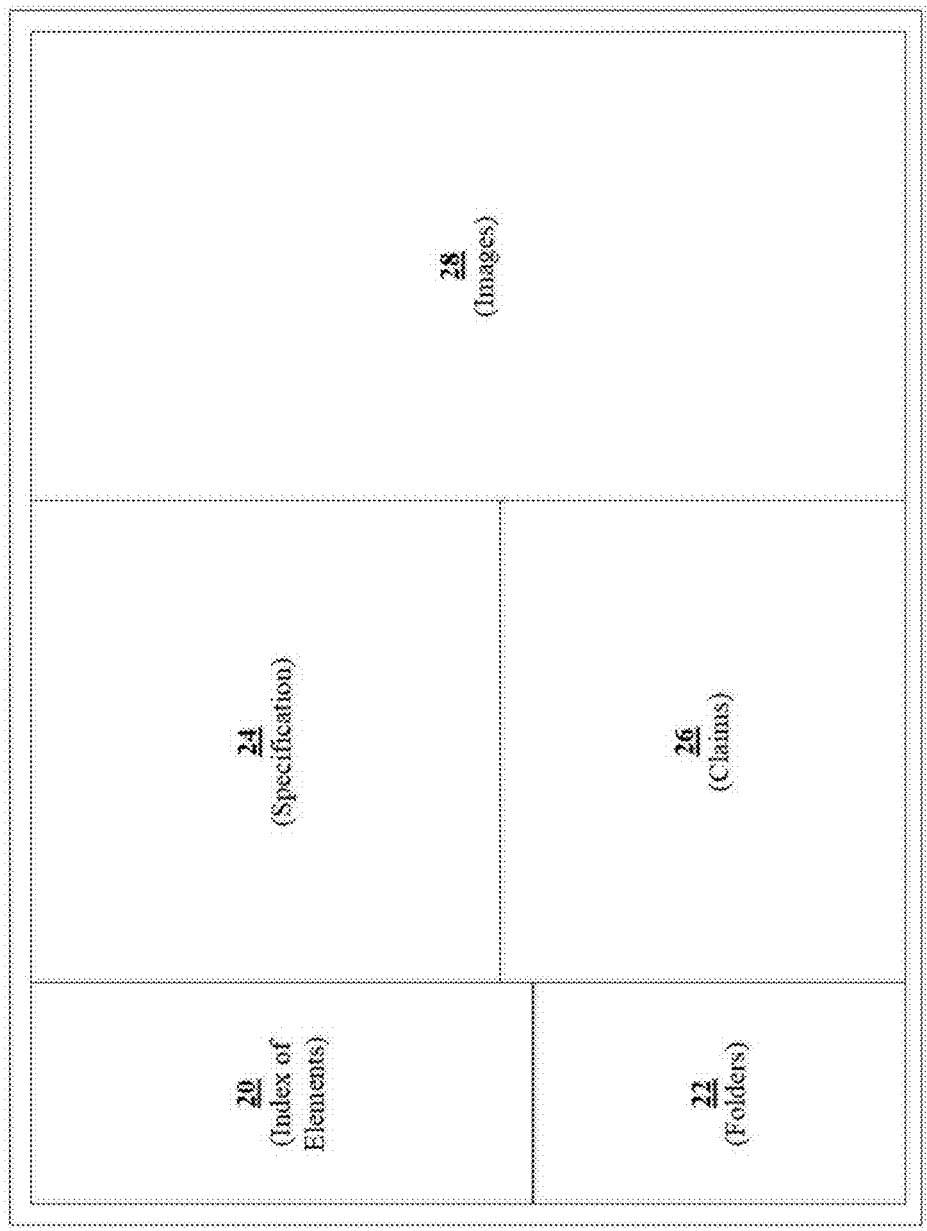
FIG. 22 is an illustration of an exemplary interface for the present invention.

FIG. 22 illustrates an alternative graphical user interface comprised of an index of elements section 20 that displays the index of elements, a folder section 22 displaying folders and patent documents analyzed, a specification section 24 that displays the written description of the invention, a claims section 26 displaying the claims beneath the specification section and an image section 28 to the right side displaying the patent document image files (including cover page, figures and the text portion of the image files in a PDF, TIFF, etc.). The image section 28 and the specification section 24 are preferably side-by-side and both vertically orientated rectangular sections in the graphical user interface. The image section 28 further preferably displays the additional markings added to the patent document image file (the display of text and markings added to the original patent document may be turned off by the user by selecting a check box (e.g. "[X] Show Only Original Patent Document"). The user is able to conveniently view sentences or paragraphs in the specification section 24 relating to one or more specific selected element name along with the corresponding figures in the images section 28 adjacent to one another of the patent document.

It can further be appreciated that more than one patent document may be analyzed and displayed within the interface. For example, tabs with the patent document number at the top, side or bottom of the graphical user interface may be utilized representing different analyzed patent documents that can be selected to display the corresponding patent document.

G. Index of Elements Indications

In the index of elements section 20, it is preferable to include an indicia of the total number of time the element name and/or element number is used in the patent document. For example, an element listed in the index of elements may have the following formats:

"20: Handle (13)" indicating that the combination of the element name and element number (i.e. "handle 20") has been referenced 13 times in the patent document.

"20: Handle (13: 21)" indicating that the element number has been referenced 13 times and the element name "handle" has been referenced 21 times in the patent document.

"20: Handle (13; Claims 3)" indicating that the element name and element number have been referenced 13 times and the element name has been referenced 3 times in the claims of the patent document.

The index of elements may be sorted by the user based upon the number of times the elements are used (e.g. the top would have the element name referenced the most in the patent document with the bottom having the element name referenced the least). In addition, the element names/numbers in the index of elements section 20 may be color coded based upon the percentage and/or number of references to each of the elements (e.g. higher referenced elements could be colored red, mid-high referenced elements could be colored blue and the lowest reference elements could be colored black to visually indicated the frequency each of the element names have been referenced in the patent document.

It is further preferable to include an indicia for each of the element names that are used in the claims. For example, each element name used in the claims could be bolded, italics, larger font, different color from the non-claim elements, a character (e.g. asterisk) placed next to the element name (e.g. 20: Handle*) and the like. For element names referenced in the claims, the user can right-click or otherwise select the element name to see the element name's usage in the claims wherein the program displays the claim(s) that include the element name within.

H. Emphasizing Element Numbers and/or Names in Figures

Figure 23:
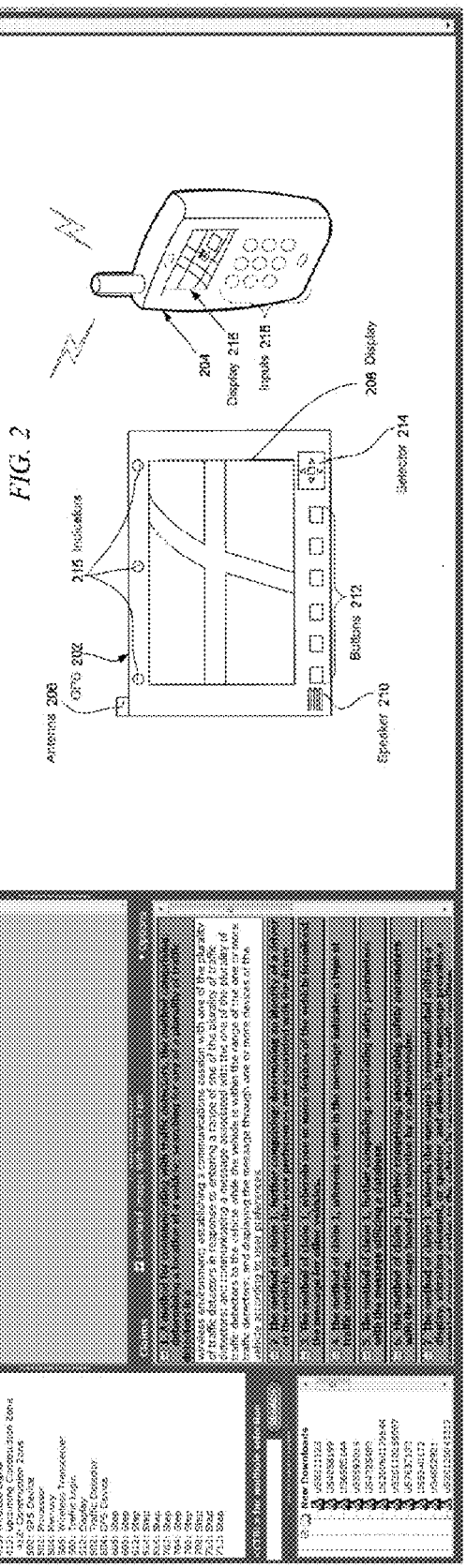
FIG. 23 illustrates U.S. Pat. No. 8,321,123 being displayed with element 208 ("Display") being selected thereby displaying the sentence text relating to the selected element in the specification section including highlighting and bolding "display 208" in the specification text.
Figure 24:
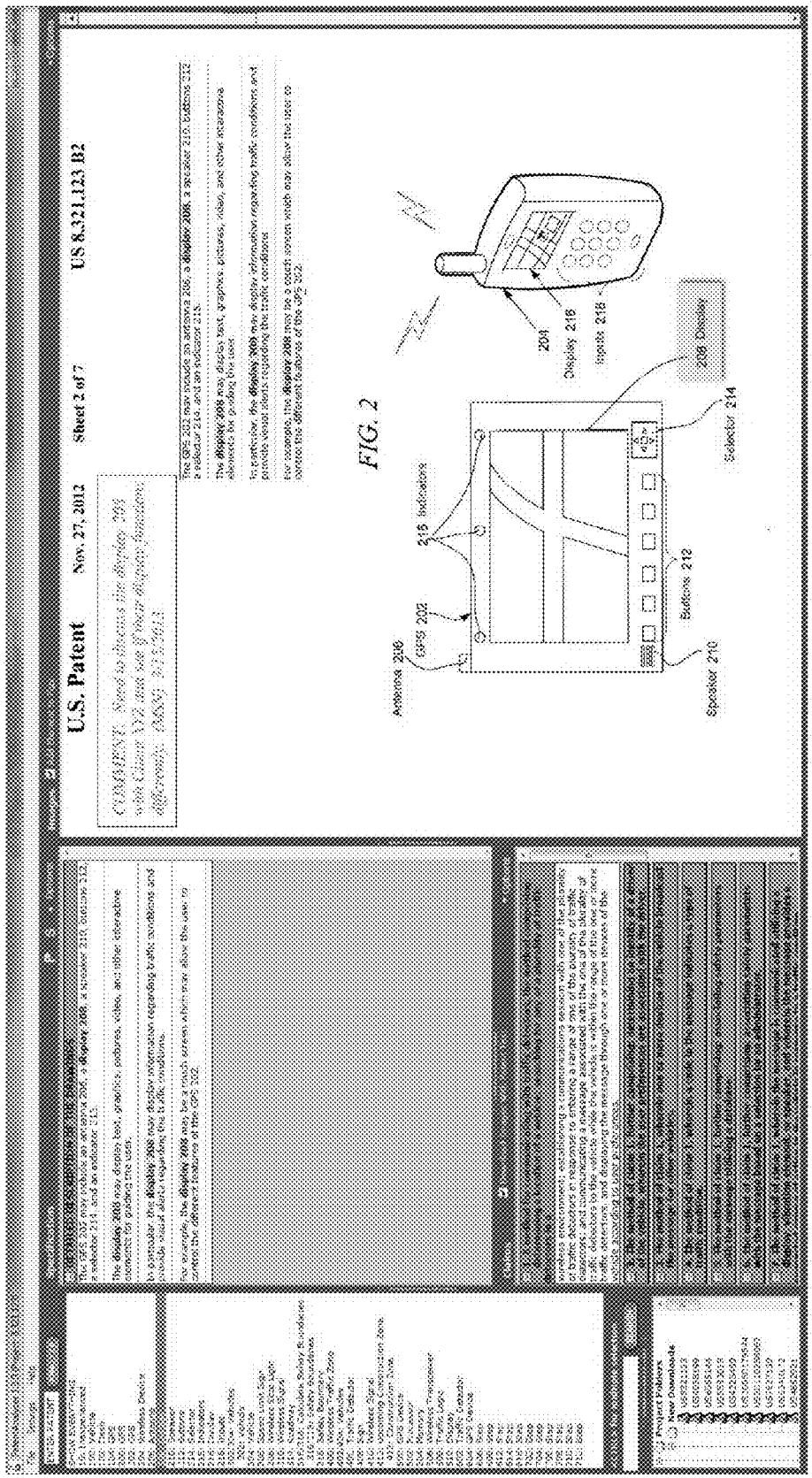
FIG. 24 illustrates the view of FIG. 23 with the addition of adding comments by the user relating to element 208, specification text relating to element 208 and with the element number 208 and the corresponding element name "display" emphasized in the figures section of the interface.

FIG. 23 illustrates U.S. Pat. No. 8,321,123 being displayed with element 208 ("Display") being selected thereby displaying the sentence text relating to the selected element in the specification section including highlighting and bolding "display 208" in the specification text. In addition, when the element 208 is selected from the index of elements, the element number and/or element name in one or more of the figures in the patent document are preferably emphasized (e.g. highlighted, bolded) and/or an indicia added near or around the element (e.g. a box or circle drawn around the element number/name; an arrow pointing to the element number/name) as illustrated in FIG. 24.

It is further preferable that when the element is selected from the index of elements that only the figure or figures that include the element are displayed and preferably with the emphasis discussed previously. The text relating to the element number/name is preferably also displayed directly on the patent image to provide for convenient viewing the by the user. When showing the figure(s) and/or text of the patent document image file, full pages can be displayed in the images section 28 and/or miniature versions of the pages may be displayed in the images section 28 thereby providing the user the ability to have an overview of the figures and/or text portion of the patent that include the reference numeral(s) selected. If miniature versions of the pages are shown, the miniature pages may be displayed in a single column of the miniature pages (e.g. display 6 miniature pages in the images section 28 at one time) or a plurality of rows (e.g. 2 miniature pages per row; 3 miniature pages per row). The user can then select one of the miniature versions of the page to show the page in full on the GUI.

Figure 30:
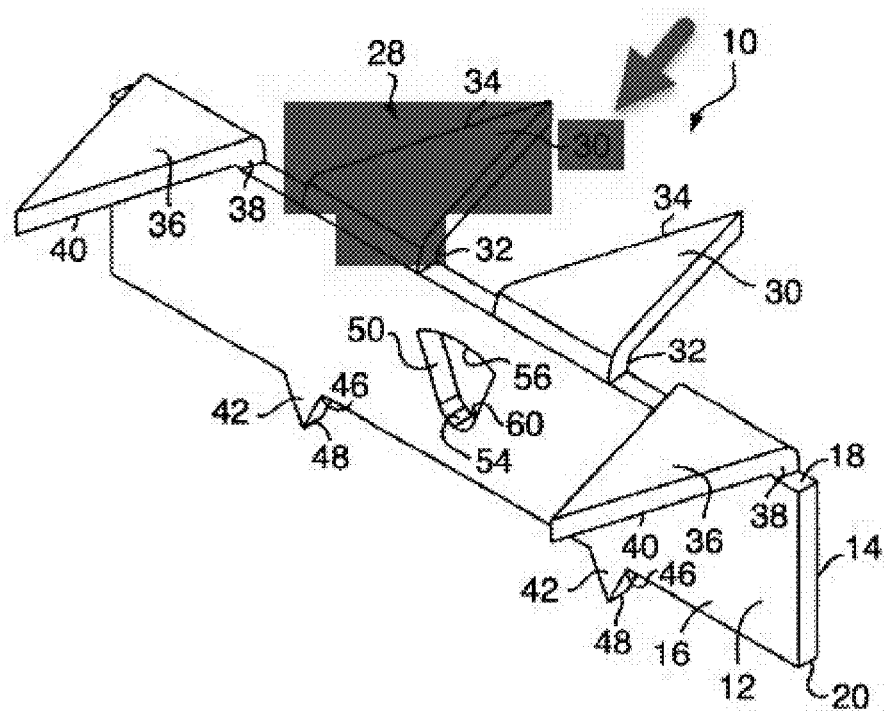
FIG. 30 illustrates emphasizing an element number (element number 30 used to identify the element name used in the claims called "first prong") used in the claims of an example patent (U.S. Pat. No. 6,416,269).

The element names used in the claims can be emphasized within the figures by emphasizing the element numbers used in the figures that correspond to the element names. In addition, any added element names to the figures may be emphasized. It is preferable that the color of font and/or highlighting used to emphasize element numbers and/or element names in the figures corresponds to the color of font and/or highlighting used in the claims. In addition, the color of font and/or highlighting used in the claims to emphasize element names used in the claims is preferably used throughout the specification and remaining portions of the patent document. FIG. 30 illustrates emphasizing an element number (element number 30 used to identify the element name used in the claims called "first prong") used in the claims of an example patent (U.S. Pat. No. 6,416,269). Either one selected element name used in the claims may be emphasized in the figures or all element names used in the claims may be emphasized as selected by the user. In addition, only the element names used in the independent claims or a selected independent claim may be emphasized in the figures.

It is preferable to allow the user to customize the style of the text that is added to the figures. For example, the user has the ability in the Settings section of the software program to select the following options for element names added to the figures of the patent document:

Font (e.g. Times New Roman)
Font Color (e.g. red, blue).
Font Size (e.g. 12 pt.)
Underlining
Characters Around Text (e.g.  Handle ).
Transparency Level of the Text (e.g. solid, 75% solid, 35% solid).

All of the above options have a default setting during installation of the software program (e.g. font color is blue). It is preferable that the text added to the patent document have a color that is not black to help differentiate it from the patent document. Also, non-black text allows for partial overwriting of the original black text/drawings of the patent document while allowing viewing of the same without significant interference. Furthermore, the above options may be utilized for the other types of text added to the patent document image file such as comments, figure reference text, element reference text and the like (all can be the same or different). It is preferable to have a light blue color utilized for the text which does not overwrite the text of the original patent document (or other lighter color).

I. Emphasizing Element Numbers and/or Names in Text Portion of Patent Image

In addition, it is preferable that when an element number/name is selected in the index of elements section 20, then the corresponding patent document shown in the image section is displayed for the user to read within the original patent document. It is further preferable that the element number/name is highlighted or otherwise emphasized within the patent document displayed in the images section to indicate the location within the text. Either the entire page or only the relevant portion of the patent document may be displayed. It is preferable to keep paragraph numbers within published patent applications and column/line numbers in granted patents in the portions of the patent document image that is displayed.

J. Emphasis of Element Names and Adding Element Numbers in Claims

It is also preferable to utilize the above technology to add reference numerals to the element names used in the claims and/or emphasize the element names in the claims (e.g. bold the element names, highlight the element names, underline the element names). The element names in the index of elements are identified in the claims and then the element numbers are added to the text directly after each of the element names in the claims (e.g. a handle (12), wherein said handle (12) includes a head portion (14) . . . ). FIG. 26 illustrates adding element numbers after the element names with brackets such as (ELEMENT NUMBER).

Either all occurrences of an element name in all of the claims can be indicated, only the first time the element name is used in an individual claim, or only the first time the element name is used in all of the claims in a claim set comprised of an independent claim followed by dependent claims. The preamble of the patent claim may also be ignored or include element numbers and/or emphasis. In addition, for longer patents, it is important to separate the elements into specific separate paragraphs when first used. FIG. 26 provides an example claim (claim 1 of U.S. Pat. No. 6,416,269) illustrating the emphasis of element names in the claim which may including bolding, coloring, underlining, italics, highlighting, adding characters or otherwise emphasizing the text of the element names.

When adding reference numerals to element names in claims, the program should start with the element names that are longer (number of words) and work its way back (e.g. start with "float rod magnet" 64 first and then go to "float rod" 33 to avoid messing up the numbering). If the program didn't follow this procedure, then the number for float rod (33) would be added first so that "float rod magnet" would be incorrectly changed to "float rod (33) magnet". Once the larger element names are marked, a tag (e.g. html tag) is added to the text so that when searching for the shorter element names the program skips the tagged text to avoid marking the same text with a different element number or emphasis.

The color of text in the claims for element names the same as the text is colored in the specification text and also color the added element names the same in the patent drawings. The claim element colors may also "grouped" by similar shades of colors based on the numbering so that related element names have similar shades (e.g. a dark red used for 20 and a medium red used for 22 and a light red used for 24). In addition, color by the closeness of usage of the element name in the specification and/or claims may be used wherein the rank of usage (i.e. the number of times used) of an element name is determined and then other element names less used are determined and color with similar colors (or same indicator character or font).

K. User Comments and Markup

It is preferable to provide the user the ability to add comments to the patent document as a whole in a comments section and directly to specific portions of the patent document (e.g. on a figure). FIG. 24 provides an example of adding comments to the patent document being analyzed. The comments and/or markup may be comprised of commentary text, highlighting, lines, shapes and the like utilized to help the user find and recall useful information with respect to the patent document. The comments and markup are preferably in a color different than the element names and other information added by the software application. Comments, identification of related patents for validity and the like may be stored within a folder system. The comments and other markups may be added to the text of the patent document and/or the image portions of the patent document.

L. Copying Text

When showing text sentences and/or paragraphs, the user has the ability of highlighting text, selecting the highlighted text and then dragging and dropping the text to a word processing program or e-mail program where the text is automatically copied/pasted into the program. Alternatively, without highlighting any text, the user can simply click on a sentence displayed in sentence mode and then drag and drop the sentence into the word processing program or e-mail program.

M. Adding Text Referencing Figure to Figure

It is preferable that when the patent document is shown in the image section 28 that the text portions within the patent document that reference the figure number are added to the image of the figure either automatically. The reference text for the figure may also be displayed when the user selects the figure number (e.g. the figure number is a hyperlink), passes over the figure number or does another gesture indicating the desire to see all text in the patent document that includes a reference to the figure number.

It is important that the program identifies situations such as "FIG. 2" and also "FIGS. 1-3" are indicators that FIG. 2 is being referenced and the corresponding text of the sentence should be displayed. FIG. 25 shows FIG. 2 of the '123 patent discussed previously with the corresponding figure text displayed on the image page of FIG. 2 so the user can easily read all references to FIG. 2 in the patent specification. The corresponding sentences (partial or full) or paragraphs (partial or full) may be displayed on the image page that include the figure number.

N. Indicate Location of Text in Patent Document

For the text shown in a sentence and/or paragraph in the specification section 24, the program shows a citation in the patent text (e.g. Column 2, Lines 3-8). The OCR process of the patent document image file provides the column numbers and line numbers that the program utilizes to identify where the text is located at in the patent document. Since line determines may be difficult, an approximately line location of the text could be provided based upon the line numbers provided in the patent (e.g. Column 2, Lines 1-10). Providing citations to the text assists a patent practitioner in finding the text within the original patent document and for including citations in documents (e.g. a response to an Office Action). It is preferable to clearly separate the citation text from the text of the patent by bolding or coloring the text for example. The citation text may also include the page number to assist in finding the text. FIG. 27 provides an example of displaying the citation to the original patent document for text in the '123 patent discussed previously indicating that the text shown in the specification section 24 is from page 11 of the patent document PDF image file, column 3, lines 3-13 of the '123 patent.

For published patent application, the citation to the patent text will be comprised of the page number and/or paragraph number (e.g. "PAGE 6, [0034]: FIG. 1 shows the . . . "). The page number for the published patent application may be the page in the image file or the page number at the top of the published patent application.

O. Online Database

An online database that all users can submit comments and prior art relating to a patent being analyzed that are shared with everyone. In addition, the online database provides a central location for file folders, downloaded patent documents, analyzed patents and can provide online access to the same documents that are analyzed within the user's desktop program. Furthermore, the user can share analyzed patent documents (with or without their comments) with third-parties. The software program periodically syncs with the online database wherein the user has an account with the online database to store the patent document data and user data.

P. Finding Paragraph Numbers or Column/Line Numbers

Patent attorneys often times have to manually search a patent document when a USPTO patent examiner provides a citation to a specific paragraph in a published patent application or to a column/line number in a granted patent. This can be time consuming and burdensome for the patent attorney.

The present invention allows a user to enter a citation for the patent document and the corresponding text is displayed in the interface for the user to view or otherwise displayed (e.g. a pop-up).

For published patent applications, the user is able to find one or more paragraphs by typing in the paragraph number(s) into a search field, selecting a paragraph number from a dropdown with the paragraph numbers to scroll through or other means. The user may enter the paragraphs desired to be viewed in various manners such as singular (e.g. 0045), plural with a separator (e.g. 0045, 0048, 0049, 0050) and/or ranges (e.g. 0045, 0048-0050). After the user submits the paragraph citation in the patent document, the corresponding paragraph text in the patent application is located and displayed for the user. The paragraph number in a published patent application is at the beginning of the paragraph and is identified with brackets "[PARAGRAPH NUMBER]" such as [0045]. The software program will search the text of the patent document for the corresponding paragraph number and display the text that follows the paragraph number (with or without the paragraph number).

Searching for selected text in granted patents is similar to published patent application with the exception that columns/line numbers are used instead of paragraph numbers. For example, the user will enter a column(s) and line number(s) to show the text in a paragraph of the patent document to be found and displayed. For a single line of text the user may enter "Column 2, Line 45", for multiple lines of text the user may enter "Column 2, Lines 45-48" and the like. The software program will search the text of the patent document for the corresponding column/line citation and display the text that is within the column/line area of the patent document. The program must OCR the patent document to identify the column numbers and the line numbers within the patent document which allows for identification of the corresponding text based upon the entry of a column number and line number range.

In addition, when text is displayed in the Specification and/or Claim Sections of the interface, the program will show the page number and/or paragraph numbers for published patent applications. The program will show the column/line numbers for granted patents to identify wherein the patent document the text is from to assist practitioners in quoting language (page number and paragraph number for published patent applications).

Q. Display Text from PDF

An additional feature of the program is to provide a right-click (or other) option where the user can see the relevant text in the PDF file in the PDF viewer or other image viewer. For example, the user looking at a specific sentence would be shown the image page with the relevant text highlighted or a portion of the column showing the text (could state column number, lines).

R. Reference Numeral Verification

It is important to verify that all reference numerals used in the patent specification are within at least one figure of the figures and that all reference numerals used in the figures of a patent application are within the written specification. For analyzing figures, numbers following a figure number identifier FIG. or FIGURE are ignored. During the verification process of reference numerals in the patent specification, if a reference numeral is identified in the specification of the patent document but not in the figures, a notice indicates which of the reference numerals in the patent specification are not present in the figures. During the verification process of reference numerals in the images, the program searches for the reference numerals identified in the figures within the patent specification and provides a notice indicating which of the reference numerals in the figures are not present in the patent specification (e.g. a pop-up or other display).

S. Office Action Analysis

It is also important to analyze a patent office action to assist patent practitioners in quickly analyzing the office action and the corresponding patent documents being cited within. The program will take a PDF (or other file format) of an Office Action and hyperlink portions in the document relating to Figures and text citations in a patent document so the user can simply select the link and they are taken to the relevant portion of the patent document. This will require the software program to analyze the text of the sentence and the reference name and/or patent number used for the citation and also to identify items such as "FIG. #" or "Paragraphs 0060-0064. The corresponding information is displayed in a separate page or a pop-up for the user so they don't have to find the same in the patent document. The program can "hyperlink" citations in the Office Action such that when the hyperlink is selected or passed over the relevant text in the patent document is displayed (e.g. pop-up). Alternatively, could open program and show the relevant information.

One alternative to hyperlinks includes convert the office action to a text version in MICROSOFT WORD and then inserting the relevant corresponding portions into the text document itself along with including a relevant figure with element names added. The added text is preferably shown in a different color and/or font style than the text of the actual office action to help the user separate the added text and the office action text.

The following exemplary procedure is followed when analyzing an office action: (1) upload an Office Action in PDF format, (2) analyze the Office Action for cited patents, text citations and figure citations for each patent, and (3) provide a Report showing the patents in order of citation (use the same headings in the OA such as 102 and 103) along with the relevant text portion in each patent and relevant figures in each patent. The program will locate the cited content (e.g. figures and/or column/line text or paragraph text or other cited text in the patent document). The cited content is then inserted into the reproduced office action showing the cited material and/or hyperlinks are added to the patent document.

T. Claim Elements

An index of claim elements may also be created utilizing the above technology to find claim elements (claim element names) within the claims. The index of claim elements may be utilized to find claim elements in the claims. For example, in U.S. Pat. No. 6,416,269, the index of claim elements would include at least the following element names:

12: Body Portion
24: First Board
30: First Prong
36: Second Prong
42: Third Prong
50: Opening The claim elements may or may not have corresponding element numbers used in the Specification portion of the patent document. In addition, by comparing the claim elements with the text of the written description, the program is able to identify and emphasize claim elements not described in the written description of the patent document.

The program will have a window that shows the independent claims side-by-side to do a comparison. Have the program highlight the different wording between each claim (e.g. could just show underlining of words that are present in one claim but not another—could also show crossing out to show missing words—or both). Instead of side by side, the independent claims could be shown with the indicia indicating the differences. The program can also show a claim tree wherein user can select/expand the claim tree to show the actual text of each claim.

The program can also identify the first time an element name is used in a claim (the program performs a search for an antecedent basis word such as "a" or "an" then identifies the element name text following the antecedent basis word) and them emphasize (e.g. bold, highlights, colors) the entire element name in the claim. The program is able to identify the element names in the claims by using the above element name identification procedure also.

The program preferably just emphasizes the first usage of the element name and then the remaining portion of claim does not include the same element name emphasize. Alternatively, the user may choose an option that emphasizes all uses of the claim element in the claims and give the user the option of providing a different emphasis for the first time the element name is used in a claim set (or a particular claim) such as bolding plus changing the font color and then only changing the font color of the element name for the second, third, fourth and later uses within the claim or claim set.

FIG. 26 provides an example wherein the first usage of "first prong" is both bolded and colored in a red font, wherein subsequent uses of the "first prong" are not bolded but have their font color in red to provide a visual connection between the terms. The first usage may be either the first usage for all of the claims in the patent document or the first usage in each claim set (e.g. the first usage of "first prong" would be bolded/colored in claims 1, 15, 17 which represent the independent claims for each of the three claim sets comprised of claims 1-14, 15-16 and 17-18 in U.S. Pat. No. 6,416,269 provided as the example in FIG. 26 of the drawings).

It is preferable to provide different colors for each element name in the claims to help the user visually identify an element name throughout a claim, all of the claims and/or within a claim set. The user may also control which element names are emphasized to help them analyze the claims (e.g. the user could select specific element names from the index of elements that they want emphasize; the user could select that they only want the element names in independent claims emphasized; the user could select to have the element names emphasized in the independent claims and/or the dependent claims). The user could also select a single element name they would like emphasized in the claims.

In addition, the program may emphasize (e.g. underlining) element names in the claims that do not have a corresponding element name used in the specification (e.g. "pointed end" underlined in the example claim 1 in FIG. 26).

Additional features of the program include identifying where a claim term is used inconsistently, downloading the entire patent file history and have the same analyzed via OCR and then show respective elements (e.g. search just the file history or search both the file history and the patent text for the patent document), provide the ability to select (e.g. check boxes) to search for relevant text in multiple patents (show relevant text and also relevant figures).

U. Claims Analysis

The program also identifies the differences between the independent claims by doing a "compare" between the claims similar to the comparison between documents performed by MICROSOFT WORD. Text that is missing in a second claim compared to a first claim would be shown in colored underling and text that is added to a second claim compared to a first claim would be shown in crossed out.

V. Infringement Analysis

By identifying the element names in claims, the program is able to identify the element names and provide a breakdown of the elements in independent claims to create a "checklist" for the user to "check" to determine infringement. The user would select the checkbox next to each of the element names that their product (or a third-party) product has to help determine if patent infringement exists.

W. Miniature Image Shots from Patent Image

The program further preferably shows actual miniature screenshots when an element is selected showing the complete sentence and/or paragraph with the element name in it and also showing the portions (or all) of figures with the element number in them such as (can highlight the element number in the figure also). Could show the images in the PDF viewer window with the text above or below the images (if a Figure number is used in the sentence—or before or after the sentence—could show the corresponding text with the corresponding figure. FIG. 28 provides an example of what the user would see from U.S. Pat. No. 7,455,444 if the user selected Base 300 in the index of elements.

Figure 29A:
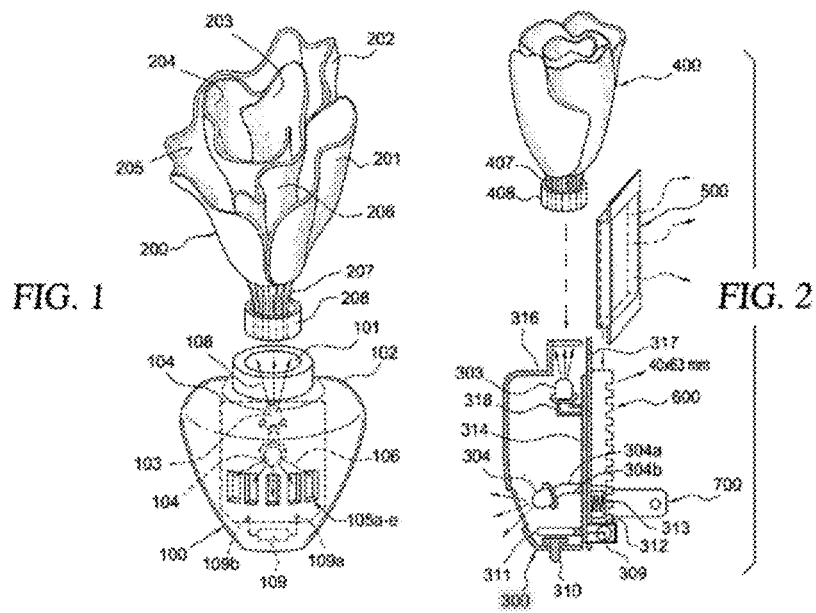
FIG. 29a illustrates an example of displaying the entire image page containing a selected element number.
Figure 29B:
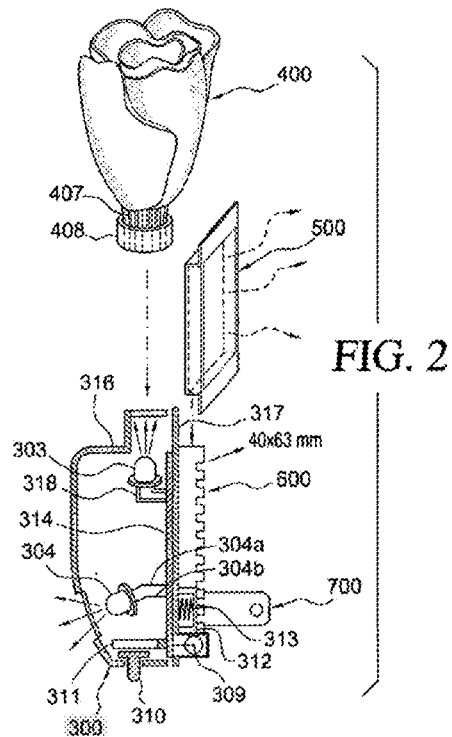
FIG. 29b illustrates an example of displaying the entire figure from an image page containing a selected element number.
Figure 29C:
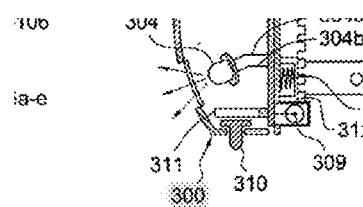
FIG. 29c illustrates an example of displaying a portion of an image page containing a selected element number.

FIGS. 29a-c illustrate examples of displaying the corresponding figures for an element name selected using the example of U.S. Pat. No. 7,455,444 with the element number 300 for the "Base" selected. The image displayed for the corresponding figure(s) for the selected element name could either be the entire page (see FIG. 29a for example), the particular figure on the page having the reference numeral (see FIG. 29b for example) or a surrounding portion that surrounds the element number (e.g. 200×200 pixels) (see FIG. 29c for example).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A method of analyzing element names in a patent document, said method comprising the steps of:

providing a patent document, wherein said patent document includes text data having a claims section;

identifying a first element name within a first claim in said claims section, by performing an optical character recognition (OCR) process of the first element name wherein said step of identifying a first element name is comprised of identifying an antecedent basis word in said first claim and identifying element name text following said antecedent basis word using the optical character recognition (OCR), wherein said antecedent basis word is comprised of the word "a" or "an"; and emphasizing, via a processor, said first element name within said first claim, wherein said step of emphasizing said first element name is comprised of one of the following: bolding, underlining, italics, highlighting, adding characters or coloring a font of said element name and inserting a first element number that corresponds to said first element name adjacent to said first element name, wherein said first element number is inserted after said first element name.

2. The method of claim 1, wherein said first element number includes a first left character and a first right character on opposing sides of said first element number.

3. The method of claim 1 wherein said step of emphasizing said first element name is comprised of emphasizing only a first usage of said first element name.

4. The method of claim 1, wherein said step of emphasizing said first element name is comprised of emphasizing all usages of said first element name.

5. The method of claim 1, wherein said step of emphasizing said first element name is comprised of emphasizing a first usage of said first element name in a first manner and emphasizing subsequent usages of said first element name in a second manner, wherein said first manner is different from said second manner.

6. The method of claim 1, wherein said step of emphasizing said first element name is comprised of changing a font characteristic of said first element name compared to a normal font characteristic of said first claim.

7. The method of claim 1, including the steps of: identifying a second element name within said first claim in said claims section; and emphasizing said second element name within said first claim.

8. The method of claim 7, wherein said second element name is emphasized differently from said first element name.

9. The method of claim 8, wherein said second element name has a font color different from a font color of said first element name.

10. The method of claim 1, including the steps of: selecting said first element name; and displaying corresponding content from said patent document.

11. The method of claim 10, wherein said step of displaying corresponding content from said patent document is comprised of displaying a content image from said patent document.

12. The method of claim 11, wherein said content image is comprised of at least a portion of a figure from said patent document that includes a first element number that corresponds to said first element name.

\* \* \* \* \*